(12) United States Patent
Zhang et al.

(10) Patent No.: US 9,668,255 B2
(45) Date of Patent: May 30, 2017

(54) METHOD AND APPARATUS FOR TRIGGERING APERIODIC FEEDBACK IN COORDINATED MULTIPOINT TRANSMISSION

(71) Applicant: FUJITSU LIMITED, Kawasaki-shi, Kanagawa (JP)

(72) Inventors: Yi Zhang, Beijing (CN); Yi Wang, Beijing (CN); Jian Zhang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/995,779

(22) Filed: Jan. 14, 2016

(65) Prior Publication Data
US 2016/0174201 A1    Jun. 16, 2016

Related U.S. Application Data

(63) Continuation of application No. 14/573,479, filed on Dec. 17, 2014, now Pat. No. 9,521,666, which is a (Continued)

(51) Int. Cl.
*H04B 7/02* (2006.01)
*H04W 72/04* (2009.01)
(Continued)

(52) U.S. Cl.
CPC .......... *H04W 72/042* (2013.01); *H04B 7/024* (2013.01); *H04B 7/0647* (2013.01);
(Continued)

(58) Field of Classification Search
CPC .... H04B 7/024; H04B 7/0626; H04B 7/0632; H04B 7/0639; H04B 7/0617
See application file for complete search history.

(56) References Cited

U.S. PATENT DOCUMENTS

| 9,094,966 B2 | 7/2015 | Kim et al. |
| 2011/0249578 A1 | 10/2011 | Nazar et al. |

(Continued)

FOREIGN PATENT DOCUMENTS

| CN | 102083223 A | 6/2011 |
| CN | 102255689 A | 11/2011 |

(Continued)

OTHER PUBLICATIONS

International Search Report issued for corresponding Chinese Patent Application No. PCT/CN2012/077115, mailed Mar. 28, 2013, with an English Translation.

(Continued)

*Primary Examiner* — Fan Ng
(74) *Attorney, Agent, or Firm* — Myers Wolin, LLC

(57) ABSTRACT

Embodiments of the present invention provide a method and apparatus for triggering aperiodic feedback in coordinated multipoint transmission. The method includes: transmitting, by an eNB to UE, dynamic control information (DCI) and preconfigured feedback sets corresponding to the DCI, so that the UE aperiodically feeds back corresponding channel state information (CSI) according to the DCI and the feedback sets corresponding to the DCI; wherein the preconfigured feedback sets corresponding to the DCI are classified according to a triggered transmitting point or a CSI-RS of non-zero power, or are classified according to configured CSI, or are classified according to an interference type. With the method and apparatus of the embodiments of the present invention, a relatively good tradeoff between flexibility of aperiodic CSI feedback and signaling load in a CoMP transmission process or a joint transmission process of CoMP and CA may be achieved.

11 Claims, 11 Drawing Sheets

101 transmitting, by an eNB to UE, dynamic control information (DCI) and preconfigured feedback sets corresponding to the DCI, so as to trigger the UE to aperiodically feed back corresponding channel state information (CSI) according to the DCI and the feedback sets corresponding to the DCI; wherein the preconfigured feedback sets corresponding to the DCI are classified according to a triggered transmitting point or a CSI-RS of non-zero power, or are classified according to configured CSI, or are classified according to an interference type

Related U.S. Application Data continuation of application No. PCT/CN2012/077115, filed on Jun. 18, 2012.

(51) Int. Cl.
| | |
|---|---|
| H04W 24/10 | (2009.01) |
| H04L 1/00 | (2006.01) |
| H04B 7/024 | (2017.01) |
| H04B 7/06 | (2006.01) |
| H04L 5/00 | (2006.01) |

(52) U.S. Cl.
CPC .......... *H04L 1/0026* (2013.01); *H04L 1/0027* (2013.01); *H04L 5/005* (2013.01); *H04L 5/0035* (2013.01); *H04L 5/0048* (2013.01); *H04L 5/0057* (2013.01); *H04W 24/10* (2013.01)

(56) References Cited

U.S. PATENT DOCUMENTS

| | | | |
|---|---|---|---|
| 2012/0182944 A1* | 7/2012 | Sorrentino | H04W 74/006 370/329 |
| 2013/0003788 A1* | 1/2013 | Marinier | H04B 7/024 375/219 |
| 2013/0235756 A1 | 9/2013 | Seo et al. | |
| 2013/0322376 A1* | 12/2013 | Marinier | H04W 72/06 370/329 |
| 2014/0126408 A1* | 5/2014 | Ding | H04B 7/024 370/252 |
| 2014/0185543 A1* | 7/2014 | Kang | H04B 7/0626 370/329 |
| 2015/0071187 A1 | 3/2015 | Chen et al. | |

FOREIGN PATENT DOCUMENTS

| | | |
|---|---|---|
| CN | 102281128 A | 12/2011 |
| CN | 102291223 A | 12/2011 |
| CN | 102377469 A | 3/2012 |
| JP | 2013-539620 A | 10/2013 |
| JP | 2014-524679 A | 9/2014 |
| WO | 2011/127092 A1 | 10/2011 |
| WO | 2012/015154 A1 | 2/2012 |
| WO | 2012/067442 A2 | 5/2012 |

OTHER PUBLICATIONS

3GPP TSG RAN WG1 Meeting #67, "RAN1 Chairman's Notes", San Francisco, USA, Nov. 14-18, 2011.
3GPP TSG RAN WG1 Meeting #68, "RAN1 Chairman's Notes", Dresden, Germany, Feb. 6-10, 2012.
1st Office Action issued by the Japan Patent Office for corresponding Japanese Patent Application No. 2015-517574, mailed on Feb. 9, 2016, with an English translation.
Notice of Preliminary Rejection issued by the Korean Intellectual Property Office for corresponding Korean Patent Application No. 10-2015-7000941, mailed on Feb. 16, 2016, with English translation.
Extended European search report with supplementary European search report and the European search opinion issued by the European Patent Office for corresponding European Patent Application No. 12879388.2, mailed on Jun. 13, 2016.
Notice of Final Rejection issued by the Korean Intellectual Property Office for corresponding Korean Patent Application No. 10-2015-7000941, mailed on Dec. 14, 2016, with English translation.

* cited by examiner

101 transmitting, by an eNB to UE, dynamic control information (DCI) and preconfigured feedback sets corresponding to the DCI, so as to trigger the UE to aperiodically feed back corresponding channel state information (CSI) according to the DCI and the feedback sets corresponding to the DCI; wherein the preconfigured feedback sets corresponding to the DCI are classified according to a triggered transmitting point or a CSI-RS of non-zero power, or are classified according to configured CSI, or are classified according to an interference type

FIG. 1

| 0 | 1 | 1 |

FIG. 2A

| 1 | 1 | 0 | 0 | 0 |

FIG. 2B

301 receiving, by user equipment (UE), DCI and preconfigured feedback sets corresponding to the DCI transmitted by an eNB

302

Feeding back aperiodically corresponding CSI by the UE according to the DCI and the feedback sets corresponding to the DCI; wherein the preconfigured feedback sets corresponding to the DCI are classified according to a triggered transmitting point or a CSI-RS of non-zero power, or are classified according to configured CSI, or are classified according to an interference type

FIG. 3

| carrier indication bits of configured carriers | | | | | | | | | | TP indication bits of carrier 0 | | | TP indication bits of carrier 1 | | | TP indication bits of carrier 2 | | |
|---|---|---|---|---|---|---|---|---|---|---|---|---|---|---|---|---|---|---|
| 1 | 1 | 1 | 0 | 0 | 0 | 0 | 0 | | + | 1 | 0 | 0 | 0 | 1 | 0 | 0 | 0 | 0 |

FIG. 10A

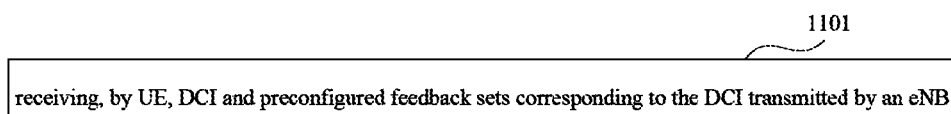

FIG. 10B

1101 receiving, by UE, DCI and preconfigured feedback sets corresponding to the DCI transmitted by an eNB

1102 feeding back aperiodically CSI of corresponding CA and CoMP by the UE according to the DCI and the feedback sets corresponding to the DCI; wherein, the preconfigured feedback sets corresponding to the DCI are classified according to a triggered transmitting point or a CSI-RS of non-zero power, or are classified according to configured CSI; wherein the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier

FIG. 11

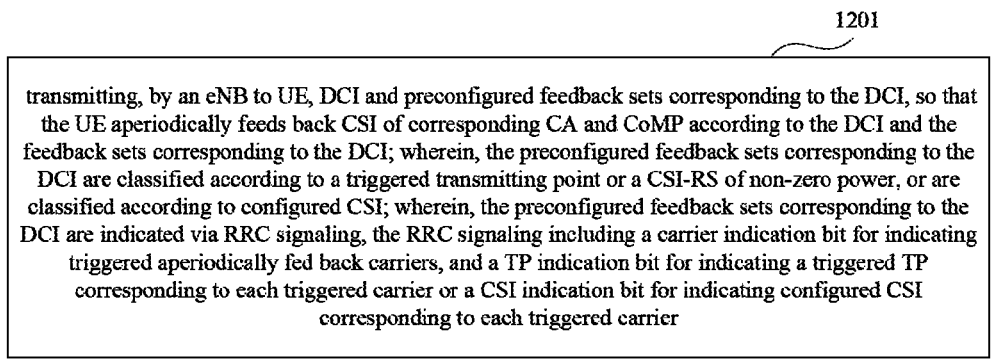

FIG. 12

| carrier indication bits of triggered carriers | | | | | | | | | TP indication bits of carrier 0 | | | TP indication bits of carrier 1 | | | TP indication bits of carrier 3 | | |
|---|---|---|---|---|---|---|---|---|---|---|---|---|---|---|---|---|---|
| 1 | 1 | 0 | 1 | 0 | 0 | 0 | 0 | + | 1 | 0 | 0 | 0 | 1 | 0 | 0 | 1 | 0 |

FIG. 13A

| carrier indication bits of triggered carriers | | | | | | | | | CSI indication bits of carrier 0 | | | | | CSI indication bits of carrier 1 | | | | | CSI indication bits of carrier 3 | | | |
|---|---|---|---|---|---|---|---|---|---|---|---|---|---|---|---|---|---|---|---|---|---|---|
| 1 | 1 | 0 | 1 | 0 | 0 | 0 | 0 | + | 1 | 1 | 1 | 0 | 0 | 0 | 1 | 0 | 1 | 0 | 0 | 0 | 1 | 1 | 0 |

FIG. 13B

1401 receiving, by UE, DCI and preconfigured feedback sets corresponding to the DCI transmitted by an eNB

1402 feeding back aperiodically CSI of corresponding CA and CoMP by the UE according to the DCI and the feedback sets corresponding to the DCI; wherein, the preconfigured feedback sets corresponding to the DCI are classified according to a triggered transmitting point or a CSI-RS of non-zero power, or are classified according to configured CSI; wherein, the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier

FIG. 14

1501 transmitting, by an eNB to UE, DCI and preconfigured feedback sets corresponding to the DCI, so that the UE aperiodically feeds back CSI of corresponding CA and CoMP according to the DCI and the feedback sets corresponding to the DCI; wherein, the preconfigured feedback sets corresponding to the DCI may be classified according to a triggered transmitting point or a CSI-RS of non-zero power, or may be classified according to configured CSI; wherein, the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to each triggered carrier

FIG. 15

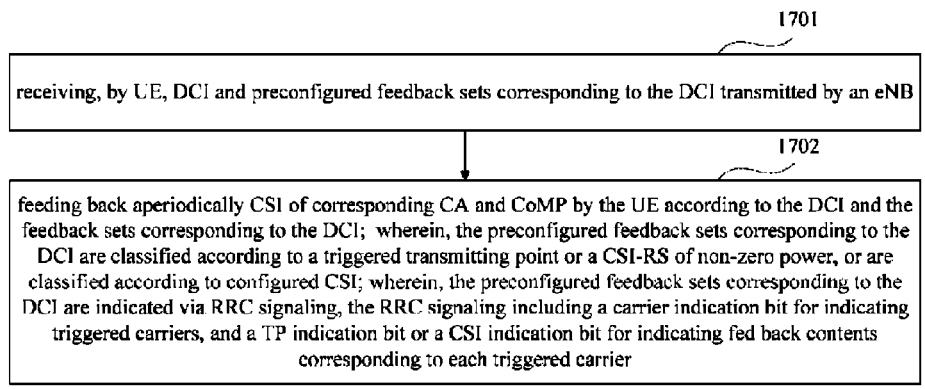
FIG. 16A
FIG. 16B
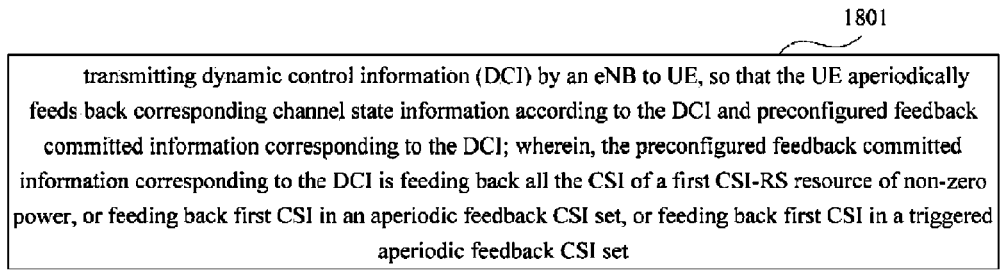
FIG. 17
FIG. 18

METHOD AND APPARATUS FOR TRIGGERING APERIODIC FEEDBACK IN COORDINATED MULTIPOINT TRANSMISSION

CROSS-REFERENCE TO RELATED APPLICATIONS

This application is a continuation of U.S. application Ser. No. 14/573,479, filed on Dec. 17, 2014 which is a continuation of International Application No. PCT/CN2012/077115, filed on Jun. 18, 2012, now pending, the contents of which are herein wholly incorporated by reference.

TECHNICAL FIELD

The present invention relates to transmission technologies in a communication system, and in particular to a method and apparatus for triggering aperiodic feedback supporting coordinated multipoint transmission in an LTE-A system.

BACKGROUND

In an LTE-A (long-term evolution-advanced) system, coordinated multipoint (CoMP) transmission technologies are introduced to enhance performance of a cell-edge user as well as increase an average throughput of the cell. The following three schemes are standardized in a downlink CoMP technologies of LTE-A R11: joint transmission (JT), dynamic point selection and coordinated scheduling/beamforming. In order that link adaptive transmission is performed accurately and a gain of CoMP transmission is obtained effectively, user equipment (UE) needs to feed back accurate PMI (precoding matrix indicator)/CQI (channel quality indication)/RI (rank indication) information for various transmission assumptions. A feedback scheme where each CSI-RS (channel state indication-RS) resource is at least supported was decided in the 3GPP RAN1 67 conference. And it was decided in the 3GPP RAN1 68 conference that a CoMP measurement set supports at most three CSI-RS resources. As a mobile station is limited with respect to an actual processing ability, a concrete number of reported CSI will be further limited. Actually, there exists a tradeoff between feedback overhead and system performance gain. Relatively more feedback information is advantageous to the system in acquiring a gain of the CoMP transmission; on the other hand, it increases overhead of uplink feedback.

In an LTE Rel. 10 system, periodic and aperiodic feedback manners are used to provide an eNB with feedback information of different granularities, so as to improve performance of the system. Aperiodic feedback has advantages of high capacity of feedback and low time delay, and fits feedback demand of CoMP. Hence, an effective triggering mechanism is needed to be designed to support aperiodic feedback in CoMP transmission.

Currently, aperiodic feedback is triggered via DCI (dynamic control information). When a user is not configured with multicarrier transmission, a 1-bit CSI request domain in DCI format 0 or DCI format 4 is employed to trigger aperiodic report of a corresponding mode; and when the user is configured with multicarrier transmission, a 2-bit CSI request domain in DCI format 0 or DCI format 4 is employed to trigger aperiodic report of a corresponding mode. As shown in Table 1, 00 denotes that report is not triggered, 01 denotes aperiodic report of a primary carrier is triggered, and 10 and 11 denote report of a set 1 and a set 2 configured by a high layer is triggered. Wherein, the set 1 and set 2 are configured via high-layer signaling, the high-layer signaling indicating via 8-bit bitmap information which of 8 subcarriers need to be reported. At present, as at most 5 subcarriers are supported in an LTE-A system, at most 5 bits are actually configured as 1; that is, subcarriers to which bits configured as 1 correspond need to be reported. Furthermore, when aperiodic report is triggered in a common search space, in order to meet length demand of DCI, triggering of 1-bit signaling is only supported. When the user is configured with multicarrier transmission, in consideration that carrier reconfiguration is an important scenario for transmitting DCI in a common search space, when 1-bit triggering signaling is configured as 1, only CSI of a downlink carrier (which is defined in a system information block 2) corresponding to triggering an uplink aperiodic feedback carrier is fed back.

TABLE 1

Interpretation of meanings of CSI domains

| Values of CSI request domains | Explanations |
| --- | --- |
| '00' | Aperiodic CSI report is not triggered |
| '01' | Aperiodic CSI report of a serving cell c is triggered |
| '10' | Aperiodic CSI report of a set 1 of a serving cell configured by a high layer is triggered |
| '11' | Aperiodic CSI report of a set 2 of the serving cell configured by a high layer is triggered |

It was found by the inventors in the implementation of the present invention that CSI fed back by a user includes rank indication (RI), precoding matrix indicator (PMI) and channel quality indication (CQI) information. An eNB configures each piece of CSI with CSI-RS resource of non-zero power and a measurement resource of interference part, and the user uses these resources to measure and report the CSI. In CoMP transmission, as multiple pieces of CSI (corresponding to different transmitting points and interference assumptions) need to be reported, feedback overhead is very large.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

An object of the embodiments of the present invention is to provide a method and apparatus for triggering aperiodic feedback in coordinated multipoint transmission, so as to solve the problem that overhead of dynamic signaling of the system is too large due to flexible CSI feedback in a CoMP transmission process or a joint transmission process of CoMP and CA.

According to an aspect of the embodiments of the present invention, there is provided a method for triggering aperiodic feedback in coordinated multipoint transmission, including:

transmitting, by an eNB to UE, dynamic control information (DCI) and preconfigured feedback sets corresponding to the DCI, so that the UE aperiodically feeds back corresponding channel state information (CSI) according to the DCI and the feedback sets corresponding to the DCI;

wherein the preconfigured feedback sets corresponding to the DCI are classified according to a triggered transmitting point or a CSI-RS of non-zero power, or are classified according to configured CSI, or are classified according to an interference type.

According to another aspect of the embodiments of the present invention, there is provided a method for triggering aperiodic feedback in coordinated multipoint transmission, including:

receiving, by UE, DCI and preconfigured feedback sets corresponding to the DCI transmitted by an eNB; and feeding back aperiodically corresponding CSI by the UE according to the DCI and the feedback sets corresponding to the DCI;

wherein the preconfigured feedback sets corresponding to the DCI are classified according to a triggered transmitting point or a CSI-RS of non-zero power, or are classified according to configured CSI, or are classified according to an interference type.

According to still another aspect of the embodiments of the present invention, there is provided a method for triggering aperiodic feedback in coordinated multipoint transmission, including:

transmitting, by an eNB to UE, first DCI and preconfigured feedback sets corresponding to the first DCI, so that the UE aperiodically feeds back CSI of corresponding carrier aggregation (CA) according to the first DCI and the feedback sets corresponding to the first DCI; and transmitting, by the eNB to the UE, second DCI and preconfigured feedback sets corresponding to the second DCI, so that the UE aperiodically feeds back CSI of corresponding coordinated multipoint transmission (CoMP) according to the second DCI and the feedback sets corresponding to the second DCI;

wherein the preconfigured feedback sets corresponding to the second DCI are classified according to a triggered transmitting point or a CSI-RS of non-zero power, or are classified according to configured CSI, or are classified according to an interference type.

According to still another aspect of the embodiments of the present invention, there is provided a method for triggering aperiodic feedback in coordinated multipoint transmission, including:

receiving, by UE, first DCI and preconfigured feedback sets corresponding to the first DCI transmitted by an eNB;

feeding back aperiodically CSI of corresponding CA by the UE according to the first DCI and the feedback sets corresponding to the first DCI;

receiving, by the UE, second DCI and preconfigured feedback sets corresponding to the second DCI transmitted by the eNB; and feeding back aperiodically CSI of corresponding CoMP by the UE according to the second DCI and the feedback sets corresponding to the second DCI;

wherein the preconfigured feedback sets corresponding to the second DCI are classified according to a triggered transmitting point or a CSI-RS of non-zero power, or are classified according to configured CSI, or are classified according to an interference type.

According to still another aspect of the embodiments of the present invention, there is provided a method for triggering aperiodic feedback in coordinated multipoint transmission, including:

transmitting, by an eNB to UE, DCI and preconfigured feedback sets corresponding to the DCI, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit corresponding to each triggered transmitting point or each piece of configured CSI.

According to still another aspect of the embodiments of the present invention, there is provided a method for triggering aperiodic feedback in coordinated multipoint transmission, including:

receiving, by UE, DCI and preconfigured feedback sets corresponding to the DCI transmitted by an eNB; and feeding back aperiodically CSI of corresponding CA and CoMP by the UE according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit corresponding to each triggered transmitting point or each piece of configured CSI.

According to still another aspect of the embodiments of the present invention, there is provided a method for triggering aperiodic feedback in coordinated multipoint transmission, including:

transmitting, by an eNB to UE, DCI and preconfigured feedback sets corresponding to the DCI, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point (TP) or a CSI-RS of non-zero power, or are classified according to configured CSI;

and wherein the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or corresponding to each piece of configured CSI.

According to still another aspect of the embodiments of the present invention, there is provided a method for triggering aperiodic feedback in coordinated multipoint transmission, including:

receiving, by UE, DCI and preconfigured feedback sets corresponding to the DCI transmitted by an eNB; and feeding back aperiodically CSI of corresponding CA and CoMP by the UE according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating carrier corresponding to each triggered TP or each piece of configured CSI.

According to still another aspect of the embodiments of the present invention, there is provided a method for triggering aperiodic feedback in coordinated multipoint transmission, including:

transmitting, by an eNB to UE, DCI and preconfigured feedback sets corresponding to the DCI, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier, or the RRC signaling including a carrier indication bit for indicating triggered aperiodically fed back carriers, and a carrier indication bit for indicating a carrier corresponding to each triggered TP or corresponding to each piece of configured CSI.

According to still another aspect of the embodiments of the present invention, there is provided a method for triggering aperiodic feedback in coordinated multipoint transmission, including:

receiving, by UE, DCI and preconfigured feedback sets corresponding to the DCI transmitted by an eNB; and feeding back aperiodically CSI of corresponding CA and CoMP by the UE according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to a triggered carrier or a CSI indication bit for indicating configured CSI corresponding to a triggered carrier, or the RRC signaling including a carrier indication bit for indicating triggered aperiodically fed back carriers, and a carrier indication bit for indicating a carrier corresponding to each triggered TP or configured CSI.

According to still another aspect of the embodiments of the present invention, there is provided a method for triggering aperiodic feedback in coordinated multipoint transmission, including:

transmitting, by an eNB to UE, DCI and preconfigured feedback sets corresponding to the DCI, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers.

According to still another aspect of the embodiments of the present invention, there is provided a method for triggering aperiodic feedback in coordinated multipoint transmission, including:

receiving, by UE, DCI and preconfigured feedback sets corresponding to the DCI transmitted by an eNB; and feeding back aperiodically CSI of corresponding CA and CoMP by the UE according to the DCI and the feedback sets corresponding to the DCI;

wherein the preconfigured feedback sets corresponding to the DCI are classified according to a triggered transmitting point or a CSI-RS of non-zero power, or are classified according to configured CSI;

and wherein the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers.

According to still another aspect of the embodiments of the present invention, there is provided a method for triggering aperiodic feedback in coordinated multipoint transmission, including:

transmitting DCI by an eNB to UE, so that the UE aperiodically feeds back corresponding CSI according to the DCI and preconfigured feedback committed information corresponding to the DCI;

wherein the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

According to still another aspect of the embodiments of the present invention, there is provided a method for triggering aperiodic feedback in coordinated multipoint transmission, including:

receiving, by UE, DCI transmitted by an eNB; and feeding back aperiodically corresponding CSI by the UE according to the DCI and preconfigured feedback committed information corresponding to the DCI;

wherein the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

According to still another aspect of the embodiments of the present invention, there is provided a method for triggering aperiodic feedback in coordinated multipoint transmission, including:

transmitting, by an eNB to UE, DCI and a preconfigured anchor CSI resource, so that the UE aperiodically feeds back corresponding CSI according to the DCI and the anchor CSI;

wherein the anchor CSI resource is at least one CSI resource to which a CSI-RS of non-zero power corresponds, or at least one CSI resource in an aperiodic feedback CSI set;

and wherein the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a measurement set of CoMP, and M is the size of a CSI set configured by the eNB for aperiodic feedback; wherein when the RRC signaling indicates the anchor CSI resource via N bits or M bits, the indication is performed in a manner of a bitmap.

According to still another aspect of the embodiments of the present invention, there is provided a method for triggering aperiodic feedback in coordinated multipoint transmission, including:

receiving, by UE, DCI and a preconfigured anchor CSI resource transmitted by an eNB; and feeding back aperiodically corresponding CSI by the UE according to the DCI and the anchor CSI resource;

wherein the anchor CSI resource is at least one CSI resource to which a CSI-RS of non-zero power corresponds, or at least one CSI resource in an aperiodic feedback CSI set;

and wherein the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a measurement set of CoMP, and M is the size of a CSI set configured by the eNB for aperiodic feedback; wherein when the RRC signaling indicates the anchor CSI resource via N bits or M bits, the indication is performed in a manner of a bitmap.

According to still another aspect of the embodiments of the present invention, there is provided an eNB, configured to trigger UE to aperiodically feed back CSI, the eNB including:

a transmitting unit configured to transmit to UE, 1-bit or 2-bit DCI and feedback sets corresponding to the DCI preconfigured via RRC signaling, so that the UE aperiodically feeds back corresponding CSI according to the DCI and the feedback sets corresponding to the DCI;

wherein the feedback sets corresponding to the DCI preconfigured via RRC signaling are classified according to a triggered transmitting point or a CSI-RS of non-zero power, or are classified according to configured CSI, or are classified according to an interference type;

and wherein the number of the feedback sets corresponding to the 1-bit DCI is 1, and the number of the feedback sets corresponding to the 2-bit DCI is 3 or 2.

According to still another aspect of the embodiments of the present invention, there is provided UE, including:

a receiving unit configured to receive 1-bit or 2-bit DCI and feedback sets corresponding to the DCI preconfigured via RRC signaling transmitted by an eNB; and a reporting unit configured to feed back aperiodically corresponding CSI according to the DCI and the feedback sets corresponding to the DCI;

wherein the feedback sets corresponding to the DCI preconfigured via RRC signaling are classified according to a triggered transmitting point or a CSI-RS of non-zero power, or are classified according to configured CSI, or are classified according to an interference type;

and wherein the number of the feedback sets corresponding to the 1-bit DCI is 1, and the number of the feedback sets corresponding to the 2-bit DCI is 3 or 2.

According to still another aspect of the embodiments of the present invention, there is provided an eNB, configured to trigger UE to aperiodically feed back CSI, the eNB including:

a first transmitting unit configured to transmit to the UE, 1-bit or 2-bit first DCI and feedback sets corresponding to the first DCI preconfigured via RRC signaling, so that the UE aperiodically feeds back CSI of corresponding CA according to the first DCI and the feedback sets corresponding to the first DCI; and a second transmitting unit configured to transmit to the UE, 1-bit or 2-bit second DCI and feedback sets corresponding to the second DCI preconfigured via RRC signaling, so that the UE aperiodically feeds back CSI of corresponding CoMP according to the second DCI and the feedback sets corresponding to the second DCI;

wherein the feedback sets corresponding to the DCI preconfigured via RRC signaling are classified according to a triggered transmitting point or a CSI-RS of non-zero power, or are classified according to configured CSI, or are classified according to an interference type;

and wherein the number of the feedback sets corresponding to the 1-bit first DCI is 1, the number of the feedback sets corresponding to the 1-bit second DCI is 1, the number of the feedback sets corresponding to the 2-bit first DCI is 3 or 2, and the number of the feedback sets corresponding to the 2-bit second DCI is 3 or 2.

According to still another aspect of the embodiments of the present invention, there is provided UE, including:

a first receiving unit configured to receive 1-bit or 2-bit first DCI and feedback sets corresponding to the first DCI preconfigured via RRC signaling transmitted by an eNB;

a first reporting unit configured to feed back aperiodically CSI of corresponding CA according to the first DCI and the feedback sets corresponding to the first DCI;

a second receiving unit configured to receive 1-bit or 2-bit second DCI and preconfigured feedback sets corresponding to the second DCI transmitted by the eNB; and a second reporting unit configured to feed back aperiodically CSI of corresponding CoMP according to the second DCI and the feedback sets corresponding to the second DCI;

wherein the preconfigured feedback sets corresponding to the second DCI are classified according to a triggered transmitting point or a CSI-RS of non-zero power, or are classified according to configured CSI, or are classified according to an interference type;

and wherein the number of the feedback sets corresponding to the 1-bit first DCI is 1, the number of the feedback sets corresponding to the 1-bit second DCI is 1, the number of the feedback sets corresponding to the 2-bit first DCI is 3 or 2, and the number of the feedback sets corresponding to the 2-bit second DCI is 3 or 2.

According to still another aspect of the embodiments of the present invention, there is provided an eNB, configured to trigger UE to aperiodically feed back CSI, the eNB including:

a transmitting unit configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit corresponding to each triggered transmitting point or each piece of configured CSI;

and wherein the number of the feedback sets corresponding to the 2-bit DCI is 3 or 2.

According to still another aspect of the embodiments of the present invention, there is provided UE, including:

a receiving unit configured to receive 2-bit DCI and feedback sets corresponding to the DCI preconfigured via RRC signaling transmitted by an eNB; and a reporting unit configured to feed back aperiodically CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit corresponding to each triggered transmitting point or each piece of configured CSI;

and wherein the number of the feedback sets corresponding to the 2-bit DCI is 3 or 2.

According to still another aspect of the embodiments of the present invention, there is provided an eNB, configured to trigger UE to aperiodically feed back CSI, the eNB including:

a transmitting unit configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or corresponding to each piece of configured CSI;

and wherein the number of the feedback sets corresponding to the 2-bit DCI is 3 or 2.

According to still another aspect of the embodiments of the present invention, there is provided UE, including:

a receiving unit configured to receive 2-bit DCI and feedback sets corresponding to the DCI preconfigured via RRC signaling transmitted by an eNB; and a reporting unit configured to feed back aperiodically CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or configured CSI;

and wherein the number of the feedback sets corresponding to the 2-bit DCI is 3 or 2.

According to still another aspect of the embodiments of the present invention, there is provided an eNB, configured to trigger UE to aperiodically feed back CSI, the eNB including:

a transmitting unit configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier, or the RRC signaling including a carrier indication bit for indicating triggered aperiodically fed back carriers, and a carrier indication bit for indicating a carrier corresponding to each triggered TP or corresponding to each piece of configured CSI;

and wherein the number of the feedback sets corresponding to the 2-bit DCI is 3 or 2.

According to still another aspect of the embodiments of the present invention, there is provided UE, including:

a receiving unit configured to receive 2-bit DCI and feedback sets corresponding to the DCI preconfigured via RRC signaling transmitted by an eNB; and a reporting unit configured to feed back aperiodically CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to a triggered carrier or a CSI indication bit for indicating configured CSI corresponding to a triggered carrier, or the RRC signaling including a carrier indication bit for indicating triggered aperiodically fed back carriers, and a carrier indication bit for indicating a carrier corresponding to each triggered TP or configured CSI;

and wherein the number of the feedback sets corresponding to the 2-bit DCI is 3 or 2.

According to still another aspect of the embodiments of the present invention, there is provided an eNB, configured to trigger UE to aperiodically feed back CSI, the eNB including:

a transmitting unit configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers;

and wherein the number of the feedback sets corresponding to the 2-bit DCI is 3 or 2.

According to still another aspect of the embodiments of the present invention, there is provided UE, including:

a receiving unit configured to receive 2-bit DCI and feedback sets corresponding to the DCI preconfigured via RRC signaling transmitted by an eNB; and a reporting unit configured to feed back aperiodically CSI of corresponding CA and CoMP according to the DCI and the feedback sets corresponding to the DCI;

wherein the preconfigured feedback sets corresponding to the DCI are classified according to a triggered transmitting point or a CSI-RS of non-zero power, or are classified according to configured CSI;

wherein the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers;

and wherein the number of the feedback sets corresponding to the 2-bit DCI is 3 or 2.

According to still another aspect of the embodiments of the present invention, there is provided an eNB, configured to trigger UE to aperiodically feed back CSI, the eNB including:

a transmitting unit configured to transmit 1-bit DCI to the UE, so that the UE aperiodically feeds back corresponding CSI according to the DCI and preconfigured feedback committed information corresponding to the DCI;

wherein the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

According to still another aspect of the embodiments of the present invention, there is provided UE, including:

a receiving unit configured to receive 1-bit DCI transmitted by an eNB; and a reporting unit configured to feed back aperiodically corresponding CSI according to the DCI and preconfigured feedback committed information corresponding to the DCI;

wherein the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

According to still another aspect of the embodiments of the present invention, there is provided an eNB, configured to trigger UE to aperiodically feed back CSI, the eNB including:

a transmitting unit configured to transmit to the UE, 1-bit DCI and an anchor CSI resource preconfigured via RRC signaling, so that the UE aperiodically feeds back corresponding CSI according to the DCI and the anchor CSI;

wherein the preconfigured anchor CSI resource is at least one CSI resource to which a CSI-RS of non-zero power corresponds, or at least one CSI resource in an aperiodic feedback CSI set;

and wherein the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a measurement set of CoMP, and M is the size of a CSI set configured by the eNB for aperiodic feedback; wherein when the RRC signaling indicates the anchor CSI resource via N bits or M bits, the indication is performed in a manner of a bitmap.

According to still another aspect of the embodiments of the present invention, there is provided UE, including:

a receiving unit configured to receive 1-bit DCI and an anchor CSI resource preconfigured via high-layer signaling transmitted by an eNB; and a reporting unit configured to feed back aperiodically corresponding CSI according to the DCI and the anchor CSI resource;

wherein the preconfigured anchor CSI resource is at least one CSI resource to which a CSI-RS of non-zero power corresponds, or at least one CSI resource in an aperiodic feedback CSI set;

and wherein the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a measurement set of CoMP, and M is the size of a CSI set configured by the eNB for aperiodic feedback; wherein when the RRC signaling indicates the anchor CSI resource via N bits or M bits, the indication is performed in a manner of a bitmap.

According to still another aspect of the embodiments of the present invention, there is provided a computer-readable program, wherein when the program is executed in an eNB, the program enables a computer to carry out the method for triggering aperiodic feedback in coordinated multipoint transmission as described above in the eNB.

According to still another aspect of the embodiments of the present invention, there is provided a storage medium in which a computer-readable program is stored, wherein the computer-readable program enables a computer to carry out the method for triggering aperiodic feedback in coordinated multipoint transmission as described above in an eNB.

According to still another aspect of the embodiments of the present invention, there is provided a computer-readable program, wherein when the program is executed in terminal equipment, the program enables a computer to carry out the method for triggering aperiodic feedback in coordinated multipoint transmission as described above in the terminal equipment.

According to still another aspect of the embodiments of the present invention, there is provided a storage medium in which a computer-readable program is stored, wherein the computer-readable program enables a computer to carry out the method for triggering aperiodic feedback in coordinated multipoint transmission as described above in terminal equipment.

An advantage of the embodiments of the present invention exists in that with the method and apparatus for triggering aperiodic feedback proposed by the embodiments of the present invention, different triggered contents are proposed, and the triggering manner taking CSI as triggered contents is good in flexibility. Different signaling designs are given in detail for different triggered contents. Taking joint transmission of CoMP and CA into account, joint methods for indicating triggering information are proposed. RRC signaling overhead may further be lowered according to the number of carriers configured by the system for the user. Taking characteristics of a common search space into account, two methods for aperiodically triggering are proposed to effectively trigger aperiodic report.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate corresponding parts in more than one embodiments. In the drawings:

FIG. 1 is a flowchart of a method for triggering aperiodic feedback in coordinated multipoint transmission in triggering aperiodic feedback in a user search space in a CoMP transmission scenario of Embodiment 1 of the present invention;

FIGS. 2a and 2b are schematic diagrams of the structure of RRC signaling in the method of Embodiment 1;

FIG. 3 is a flowchart of processing at a UE side of Embodiment 2 of the present invention corresponding to the method of Embodiment 1;

FIGS. 10a and 10b are schematic diagrams of the structure of RRC signaling according to Embodiment 7;

FIG. 11 is a flowchart of processing at a UE side of Embodiment 8 of the present invention corresponding to the method of Embodiment 7;

FIG. 12 is a flowchart of a method for triggering aperiodic feedback in coordinated multipoint transmission in triggering aperiodic feedback in a user search space in a joint transmission scenario of CoMP and CA of Embodiment 9 of the present invention;

FIGS. 13a and 13b are schematic diagrams of the structure of RRC signaling according to Embodiment 9;

FIG. 14 is a flowchart of processing at a UE side of Embodiment 10 of the present invention corresponding to the method of Embodiment 9;

FIG. 15 is a flowchart of a method for triggering aperiodic feedback in coordinated multipoint transmission in triggering aperiodic feedback in a user search space in a joint transmission scenario of CoMP and CA of Embodiment 11 of the present invention;

FIGS. 16a and 16b are schematic diagrams of the structure of RRC signaling according to Embodiment 11;

FIG. 17 is a flowchart of processing at a UE side of Embodiment 12 of the present invention corresponding to the method of Embodiment 11;

FIG. 18 is a flowchart of a method for triggering aperiodic feedback in coordinated multipoint transmission in triggering aperiodic feedback in a common search space of Embodiment 13 of the present invention;

DETAILED DESCRIPTION

Figure 4:
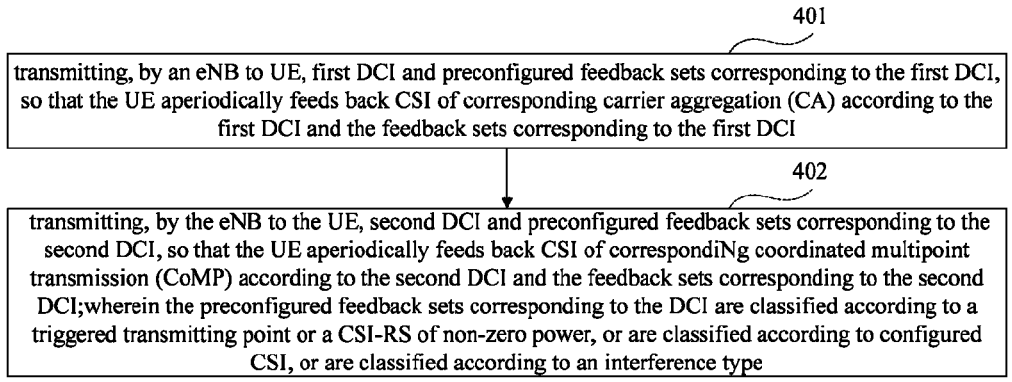
FIG. 4 is a flowchart of a method for triggering aperiodic feedback in coordinated multipoint transmission in triggering aperiodic feedback in a user search space in a joint transmission scenario of CoMP and CA of Embodiment 3 of the present invention.

The foregoing and other features of the embodiments of the present invention shall become apparent with reference to the drawings and the following description. These embodiments are illustrative only, and are not intended to limit the present invention. For the principle and implementation modes of the present invention to be easily understood by those skilled in the art, the implementation modes of the present invention shall be described taking a method for triggering aperiodic feedback in CoMP transmission in an LTE-A system as an example. However, it should be understood that the present invention is not limited to the above system, and is applicable to other systems related to triggering aperiodic feedback.

A method of combining DCI and high-layer signaling is followed in the following embodiments, so as obtain a relatively good tradeoff between flexibility of triggering aperiodic feedback and an amount of signaling load. For the methods of the embodiments of the present invention to be more clear and easy to be understood, the methods for triggering aperiodic feedback of various embodiments of the present invention shall be described below taking different application scenarios, such as a scenario of triggering in a user search space (a CoMP transmission scenario, and a scenario of combining CoMP and CA), and a scenario of triggering in a common search space (a CoMP transmission scenario, and a scenario of combining CoMP and CA), as examples. However, the methods for triggering aperiodic feedback in different scenarios are not independent of each other. For example, the methods for triggering in the CoMP transmission scenario may also be applicable to the scenario of joint transmission scenario of CoMP and CA, and the methods for triggering in a user search space may also be applicable to the methods of triggering in a common search space in the CoMP transmission scenario, which shall be described below.

CoMP Scenario where Aperiodic Feedback is Triggered in a User Search Space

In an LTE-A system, in order to support the CoMP transmission, CSI at different transmitting points and in different interference assumptions needs to be fed back. In order to obtain a tradeoff between feedback flexibility and signaling overhead, a method of combining dynamic DCI and high-layer RRC signaling is used in the embodiments of the present invention.

Embodiment 1

An embodiment of the present invention provides a method for triggering aperiodic feedback in coordinated multipoint transmission. FIG. 1 is a flowchart of the method. Referring to FIG. 1, the method includes:

step 101: transmitting, by an eNB to UE, dynamic control information (DCI) and preconfigured feedback sets corresponding to the DCI, so as to trigger the UE to aperiodically feed back corresponding channel state information (CSI) according to the DCI and the feedback sets corresponding to the DCI.

In this embodiment, the aperiodic feedback is triggered in a user search space. Therefore, the DCI signaling may reuse 2-bit information in a CSI requesting domain of DCI format0 or DCI format4. That is, when the aperiodic feedback (report) is triggered in the user search space, the eNB triggers the UE to perform the aperiodic feedback of the CSI by transmitting 2-bit CSI requesting signaling (DCI) to the UE. In an implementation mode, for the 2-bit DCI, 00 indicates not triggering aperiodic report, and 01, 10 and 11 indicate respectively triggering aperiodic report of a feedback set 1, a feedback set 2 and a feedback set 3, which are configured by a high layer. In another implementation mode, for the 2-bit DCI, 00 indicates not triggering aperiodic report, 01 indicates triggering CSI report of an anchor cell (a primary cell or a specific single cell), and 10 and 11 indicate respectively triggering aperiodic report of a feedback set 1 and a feedback set 2, which are configured by a high layer.

In this embodiment, corresponding to each non-all-zero bit, such as 01, 10 and 11, of the DCI, the eNB preconfigures a corresponding feedback set, that is, the above feedback set 1, feedback set 2 or feedback set 3, so that the UE performs aperiodic feedback of the corresponding CSI according to a content indicated by a bit of the received DCI and a corresponding feedback set.

In this embodiment, if a periodically fed back CSI set is a subset of an aperiodically fed back CSI set, the eNB may realize indication of periodic and aperiodic CSI feedback by configuring directly a CSI set via high-layer signaling (RRC signaling). Wherein, the aperiodic CSI feedback use this set directly. And if an aperiodically fed back CSI set is unable to contain a periodically fed back CSI set, the eNB not only needs to configure a CSI set needed by joint feedback via high-layer signaling, but also needs to configure a CSI set for the aperiodic feedback via high-layer signaling. At this moment, the above preconfigured feedback sets corresponding to the DCI are selected from the CSI set configured for the aperiodic feedback by the high layer.

Wherein, the preconfigured feedback sets corresponding to the DCI may be classified according to a triggered transmitting point or a CSI-RS of non-zero power, or may be classified according to configured CSI, or may be classified according to an interference type.

In an embodiment, the feedback sets are classified according to a triggered transmitting point (TP) or a CSI-RS of non-zero power, in this embodiment, each feedback set is used to indicate a CSI set to which a transmitting point needing to be triggered or a CSI-RS of non-zero power corresponds. For example, feedback sets 1, 2 and 3 denote CSI sets to which triggered transmitting points or CSI-RSs of non-zero power correspond, respectively. In this embodiment, assuming that the size of a CoMP measurement set is N, the feedback sets may be indicated by bitmaps of N bits of radio resource control (RRC) signaling. Wherein, the triggered transmitting points are configured as 1 in the bitmaps of N bits. Taking N=3 as an example, that is, the size of the CoMP measurement set is 3, there may be 3 transmitting points for performing CoMP transmission. Assuming that two transmitting points are triggered in the feedback set 1, in the bitmaps of 3 bits of the RRC signaling, the bits corresponding to the two transmitting points are configured as 1, as shown in FIG. 2a.

In this embodiment, as each CSI-RS of non-zero power may correspond to different interference assumptions, it will contain multiple pieces of CSI. Hence, the feedback sets may be classified in this embodiment according to the CSI-RSs of non-zero power; that is, the feedback sets indicate to report all pieces of CSI containing CSI-RSs of non-zero power in possible aperiodic feedback CSI sets.

In this embodiment, in order to increase flexibility, the eNB may further preconfigure interference assumptions needing to be fed back corresponding to each CSI-RS of non-zero power, so that the UE aperiodically feeds back corresponding CSI according to the interference assumptions. The interference assumptions may also be configured via RRC signaling. Taking still that the size of a CoMP measurement set is N as an example, in this embodiment, the interference assumptions may be configured via RRC signaling of $2^{(N-1)}$ bits; wherein, each bit being configured as 1 shows that the CSI under a corresponding interference assumption needs to be fed back.

In another embodiment, the feedback sets are classified according to the configured CSI, in this embodiment, each feedback set is used to indicate a CSI set needing to be triggered. For example, feedback sets 1, 2 and 3 respectively denote CSI sets needing to be triggered.

In this embodiment, the feedback sets may be indicated by bitmaps of M bits of RRC signaling; where, M is the size of a CSI set configured by the eNB for the aperiodic feedback, and may also be the largest size of a CSI set of aperiodic report that can be supported by the user; for example, M=5 or 6. Wherein, a bit configured as 1 denotes that corresponding CSI needs to be fed back, taking M=5 as an example, a manner of indication of the feedback sets is as shown in FIG. 2b. With such a method of classification, granularities of indicating aperiodic feedback are more fine.

In another embodiment, the feedback sets are classified according to an interference type, in this embodiment, each feedback set is used to indicate a CSI set to which a possible interference type corresponds. For example, feedback sets 1, 2 and 3 respectively denote report of possible interference types.

In this embodiment, taking still that the size of a CoMP measurement set is N as an example, as there exist $2^{(N-1)}$ possible interference types, the feedback sets may be indicated via RRC signaling of $2^{(N-1)}$ bitmap bits, which denote interference types needing to be reported. That is, in a CSI set of aperiodic feedback, all the CSI containing the interference types indicated by the feedback sets (CSI containing multiple assumptions of CSI-RS of non-zero power) needs to be reported. For example, for a CoMP set with the size of a measurement set being 3, 4 bits need to be employed respectively to indicate reported CSI information in sets 1, 2 and 3.

In the above embodiments, new RRC signaling may be employed to indicate a feedback set of dynamically triggered aperiodic feedback, such as the RRC signaling shown in FIGS. 2a and 2b; and 8-bit RRC indication signaling in a carrier aggregation (CA) system may be reused to indicate a CSI feedback set of dynamically triggered aperiodic feedback. This embodiment is not limited thereto, and classifying the feedback sets according to the above-described method of classification and configuring corresponding number of bits of RRC signaling to indicate the feedback sets according to the method of classification are all covered by the protection scope of the present invention.

By using the method of this embodiment to trigger the UE to perform aperiodic feedback, the UE selectively performs report according to conditions defined by the feedback sets, reports only a CSI set to which a triggered transmitting point corresponds, reports only a CSI set to which a CSI-RS of non-zero power corresponds, reports only a triggered CSI set, or reports only CSI sets to which some interference types correspond, instead of reporting all the CSI (multiple pieces of CSI corresponding to different transmitting points and interference assumption conditions), thereby solving the problem of large feedback overhead due to that the multiple pieces of CSI corresponding to different transmitting points and interference assumption conditions need to be reported, and realizing a relatively good tradeoff between feedback flexibility and system signaling overhead.

Embodiment 2

An embodiment of the present invention further provides a method for triggering aperiodic feedback in coordinated multipoint transmission, which is processing at a UE side corresponding to the method of Embodiment 1. FIG. 3 is a flowchart of the method. Referring to FIG. 3, the method includes:

step 301: receiving, by user equipment (UE), DCI and preconfigured feedback sets corresponding to the DCI transmitted by an eNB; and step 302: feeding back aperiodically corresponding CSI by the UE according to the DCI and the feedback sets corresponding to the DCI.

In this embodiment, a manner of indicating the DCI and a manner of classifying the feedback sets are identical to those of Embodiment 1, the contents of which being incorporated herein, which shall not be described herein any further.

In this embodiment, the UE determines the feedback sets according to the received DCI transmitted by the eNB, and performs aperiodic feedback of the corresponding CSI according to the contents indicated by the feedback sets. Wherein, if 2-bit information of the DCI is 00, it denotes that aperiodic report is not triggered. As the embodiments of the present invention are addressed to cases where aperiodic report is triggered, in the following description, a case where 2-bit information of the DCI is 00 is excluded, except otherwise specified.

In this embodiment, assuming that 2-bit information, 01, 10 and 11, of the DCI, respectively denote to trigger feedback sets 1, 2 and 3 configured by a high layer, if the DCI received by the UE is 10, the feedback set 2 is triggered, and the UE performs aperiodic feedback of the corresponding CSI according to the contents indicated by the feedback set 2 configured by the high layer. For example, if the feedback set 2 configured by the high layer indicates a triggered transmitting point via bitmaps of N bits (N is the size of a CoMP measurement set) of RRC signaling, the UE reports only a CSI set to which the triggered transmitting point corresponds; if the feedback set 2 configured by the high layer indicates a CSI-RS of non-zero power via bitmaps of N bits of RRC signaling, the UE reports only a CSI set to which the CSI-RS of non-zero power corresponds; if the feedback set 2 configured by the high layer indicates a triggered CSI set via bitmaps of M bits (M is a CSI set configured by the high layer for the aperiodic feedback) of RRC signaling, the UE reports only the triggered CSI set; and if the feedback set 2 configured by the high layer indicates interference types needing to be reported via $2^{(N-1)}$ bits of RRC signaling, the UE reports only the CSI sets to which the interference types correspond.

By using the method of this embodiment, the UE selectively performs report according to conditions defined by the feedback sets, instead of reporting all the CSI (multiple pieces of CSI corresponding to different transmitting points and interference assumption conditions), thereby solving the problem of large feedback overhead due to that multiple pieces of CSI corresponding to different transmitting points and interference assumption conditions need to be reported in CoMP transmission, and realizing a relatively good tradeoff between feedback flexibility and system signaling overhead.

Scenario of Jointing CoMP and CA where Aperiodic Feedback is Triggered in a User Search Space In an LTE-A system, a carrier aggregation (CA) technology may be jointed with CoMP to further improve transmission efficiency of UE. In this embodiment, triggering the UE to perform aperiodic report of CSI is achieved by independently configuring or jointly configuring.

Embodiment 3

An embodiment of the present invention further provides a method for triggering aperiodic feedback in coordinated multipoint transmission, in which triggering UE to perform aperiodic report of CSI is achieved by independently configuring. FIG. 4 is a flowchart of the method. Referring to FIG. 4, the method includes:

step 401: transmitting, by an eNB to UE, first DCI and preconfigured feedback sets corresponding to the first DCI, so that the UE aperiodically feeds back CSI of corresponding carrier aggregation (CA) according to the first DCI and the feedback sets corresponding to the first DCI; and step 402: transmitting, by the eNB to the UE, second DCI and preconfigured feedback sets corresponding to the second DCI, so that the UE aperiodically feeds back CSI of corresponding coordinated multipoint transmission (CoMP) according to the second DCI and the feedback sets corresponding to the second DCI.

In this embodiment, the preconfigured feedback sets corresponding to the second DCI may be classified according to a triggered transmitting point or a CSI-RS of non-zero power, or may be classified according to configured CSI, or may be classified according to an interference type. A particular manner of classification and a manner of indicating signaling are identical to those in Embodiment 1, the contents of which being incorporated herein, which shall not be described herein any further.

In an embodiment, the first DCI and the second DCI are respectively 1-bit information, and the method of this embodiment reuses current 2-bit DCI signaling, in which 1 bit (the second DCI) is used to trigger CoMP aperiodic report, and the other bit (the first DCI) is used to trigger CA aperiodic report.

For example, 0x denotes that the CoMP aperiodic report is not triggered, 1x denotes that a set 1 configured by RRC for CoMP aperiodic feedback is triggered, x0 denotes that the CA aperiodic report is not triggered, and x1 denotes that a set 2 configured by RRC for CA aperiodic feedback is triggered.

In another embodiment, the first DCI and the second DCI are respectively 2-bit information, and the method of this embodiment triggers CoMP by adding DCI signaling of 2 bits, and the original DCI signaling of 2 bits is used to trigger CA aperiodic report.

In this embodiment, indication manners of the first DCI and the second DCI are identical to those in Embodiment 1. For example, 00 indicates that aperiodic feedback is not triggered, and 01, 10 and 11 indicate that aperiodic feedback of feedback set 1, feedback set 2 and feedback set 3, configured by a high layer, is triggered; or 11 indicates that aperiodic feedback is not triggered, 01 indicates that aperiodic feedback of CSI of an anchor cell (a primary cell or a specific single cell) is triggered, and 10 and 11 indicate that aperiodic feedback of feedback set 1 and feedback set 2 configured by a high layer is triggered.

In this embodiment, feedback sets corresponding to the first DCI and feedback sets corresponding to the second DCI may be configured via RRC signaling by using the method of Embodiment 1, the contents of which being incorporated herein, which shall not be described herein any further. For example, the feedback sets corresponding to the first DCI are indicated via 8-bit RRC signaling, and the feedback sets corresponding to the second DCI are indicated via idle bits in the 8-bit RRC signaling or newly-added RRC signaling (such as 2a or 2b).

By using the method of this embodiment to trigger the UE to perform aperiodic feedback, the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Embodiment 4

Figure 5:
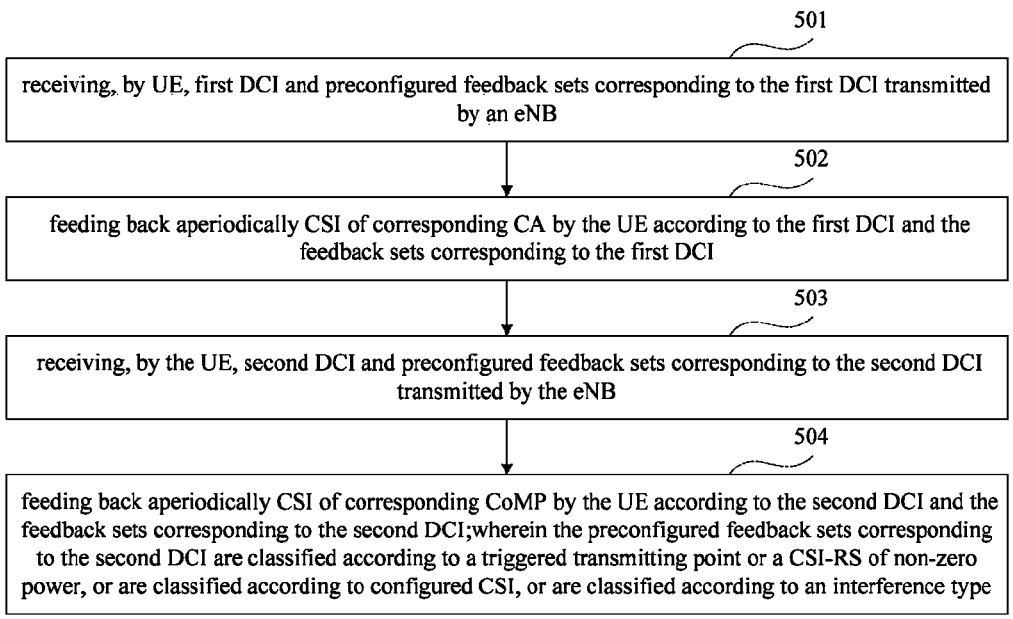
FIG. 5 is a flowchart of processing at a UE side of Embodiment 4 of the present invention corresponding to the method of Embodiment 3.

An embodiment of the present invention further provides a method for triggering aperiodic feedback in coordinated multipoint transmission, which is processing at a UE side corresponding to the method of Embodiment 3. FIG. 5 is a flowchart of the method. Referring to FIG. 5, the method includes:

step 501: receiving, by UE, first DCI and preconfigured feedback sets corresponding to the first DCI transmitted by an eNB;

step 502: feeding back aperiodically CSI of corresponding CA by the UE according to the first DCI and the feedback sets corresponding to the first DCI;

step 503: receiving, by the UE, second DCI and preconfigured feedback sets corresponding to the second DCI transmitted by the eNB; and step 504: feeding back aperiodically CSI of corresponding CoMP by the UE according to the second DCI and the feedback sets corresponding to the second DCI.

In this embodiment, manners of indicating the first DCI and the second DCI are identical to those of Embodiment 3, the contents of which being incorporated herein, which shall not be described herein any further.

In this embodiment, the preconfigured feedback sets corresponding to the second DCI may be classified according to a triggered transmitting point or a CSI-RS of non-zero power, or may be classified according to configured CSI, or may be classified according to an interference type needing to be reported. A particular manner of classifying of a feedback set and a manner of signaling indication of a feedback set are identical to those in Embodiment 1, the contents of which being incorporated herein, which shall not be described herein any further.

In this embodiment, the UE determines the feedback sets corresponding to the first DCI according to the received first DCI transmitted by the eNB, and performs aperiodic feedback of the CSI of corresponding CA according to the contents indicated by the feedback sets corresponding to the first DCI. Furthermore, the UE determines the feedback sets corresponding to the second DCI according to the received second DCI transmitted by the eNB, and performs aperiodic feedback of the CSI of corresponding CoMP according to the contents indicated by the feedback sets corresponding to the second DCI.

Therefore, the UE may determine corresponding feedback sets of CA and corresponding feedback sets of CoMP according to the received first DCI and second DCI, perform aperiodic feedback of the CSI of CA according to the feedback sets of CA, and perform aperiodic feedback of the CSI of CoMP according to the feedback sets of CoMP.

By using the method of this embodiment, the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Embodiment 5

Figure 6:
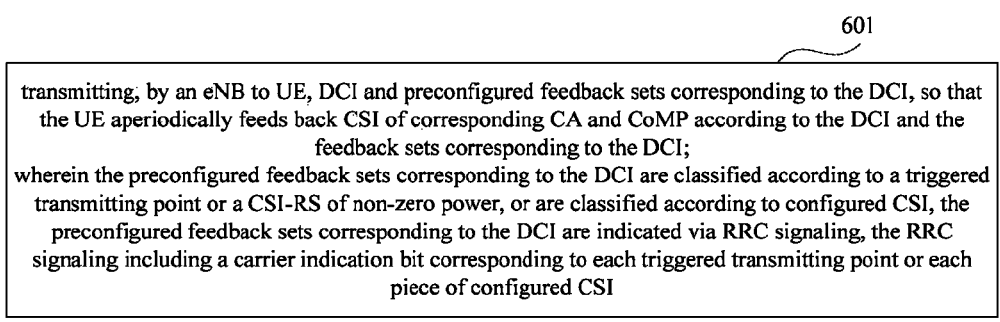
FIG. 6 is a flowchart of a method for triggering aperiodic feedback in coordinated multipoint transmission in triggering aperiodic feedback in a user search space in a joint transmission scenario of CoMP and CA of Embodiment 5 of the present invention.

An embodiment of the present invention further provides a method for triggering aperiodic feedback in coordinated multipoint transmission, in which triggering UE to perform aperiodic report of CSI is achieved by jointly configuring. FIG. 6 is a flowchart of the method. Referring to FIG. 6, the method includes:

step 601: transmitting, by an eNB to UE, DCI and preconfigured feedback sets corresponding to the DCI, so that the UE aperiodically feeds back CSI of corresponding CA and CoMP according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, the preconfigured feedback sets corresponding to the DCI are indicated via RRC signaling, the RRC signaling including a carrier indication bit corresponding to each triggered transmitting point or each piece of configured CSI.

In this embodiment, multiple feedback sets configured via RRC signaling are triggered via 2-bit DCI, the feedback sets being determined by CSI joining carriers and CoMP.

Figure 7A:
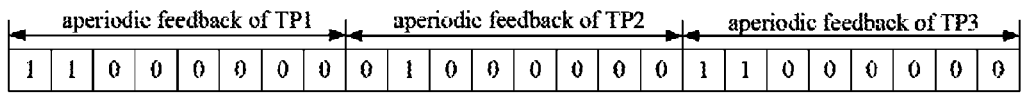
FIGS. 7a and 7b are schematic diagrams of the structure of RRC signaling according to the method of Embodiment 5.

In an embodiment, when the feedback sets are classified according to a triggered transmitting point or a CSI-RS of non-zero power, that is, the transmitting point is taken as a content of the aperiodic feedback, the RRC signaling used to indicate the feedback sets is achieved by concatenated configuration of multiple transmitting points, that is, the RRC signaling includes a carrier indication bit corresponding to each triggered transmitting point, as shown in FIG. 7a. In FIG. 7a, selection of subcarriers from 8 bits is taken as an example. Actually, as an existing LTE-A system supports at most 5 subcarriers, corresponding to each triggered TP, subcarriers available for selection may only be indicated by 5 bits.

Figure 7B:
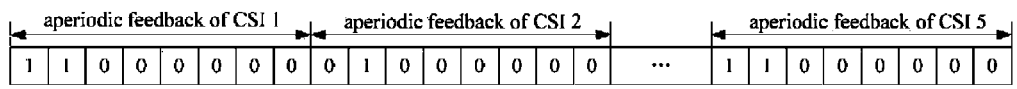

In another embodiment, when the feedback sets are classified according to configured CSI, that is, the CSI is taken as a content of the aperiodic feedback, the RRC signaling used to indicate the feedback sets is achieved by concatenated configuration of the CSI, that is, the RRC signaling includes a carrier indication bit corresponding to each piece of configured CSI, as shown in FIG. 7b. In FIG. 7b, selection of subcarriers from 8 bits is also taken as an example, likewise, as an existing LTE-A system supports at most 5 subcarriers, corresponding to each piece of configured CSI, subcarriers available for selection may only be indicated by 5 bits.

By using the method of this embodiment to trigger the UE to perform the aperiodic feedback, the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Embodiment 6

Figure 8:
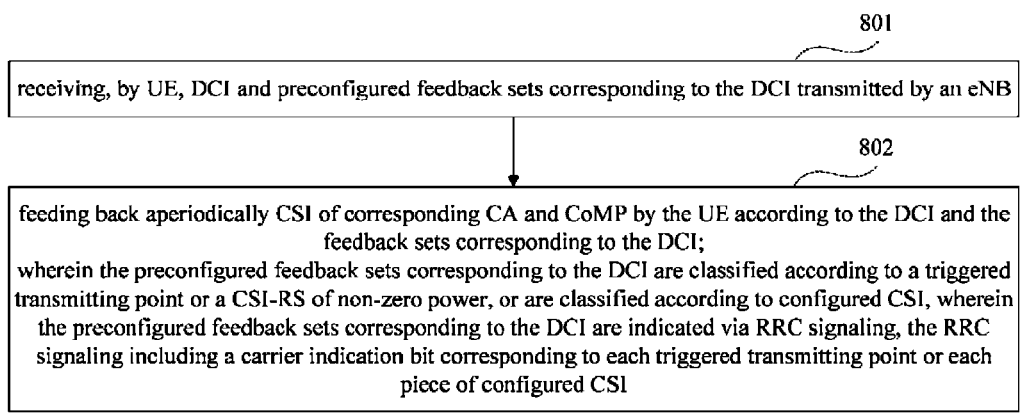
FIG. 8 is a flowchart of processing at a UE side of Embodiment 6 of the present invention corresponding to the method of Embodiment 5.

An embodiment of the present invention further provides a method for triggering aperiodic feedback in coordinated multipoint transmission, which is processing at a UE side corresponding to the method of Embodiment 5. FIG. 8 is a flowchart of the method. Referring to FIG. 8, the method includes:

step 801: receiving, by UE, DCI and preconfigured feedback sets corresponding to the DCI transmitted by an eNB; and step 802: feeding back aperiodically CSI of corresponding CA and CoMP by the UE according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, the preconfigured feedback sets corresponding to the DCI are indicated via RRC signaling, the RRC signaling including a carrier indication bit corresponding to each triggered transmitting point or each piece of configured CSI.

In this embodiment, after receiving the DCI transmitted by the eNB, the UE determines corresponding feedback sets according to the DCI, and performs aperiodic feedback of corresponding CSI according to the contents indicated by the feedback sets. Wherein, the feedback sets are indicated by the eNB via RRC signaling, and corresponding to different classification manners, the RRC signaling employs different indication manners. Particular indication manners are described in detail in Embodiment 5, which shall not be described herein any further.

By using the method of this embodiment, the UE performs aperiodic feedback of corresponding CSI according to the DCI transmitted by the eNB and the feedback sets indicated by the high layer (RRC signaling), thereby solving the problem of large feedback overhead due to that multiple pieces of CSI corresponding to different transmitting points and interference assumptions need to be reported in joint transmission of CA and CoMP, and achieving a relatively good tradeoff between feedback flexibility and system signaling overhead.

Embodiment 7

Figure 9:
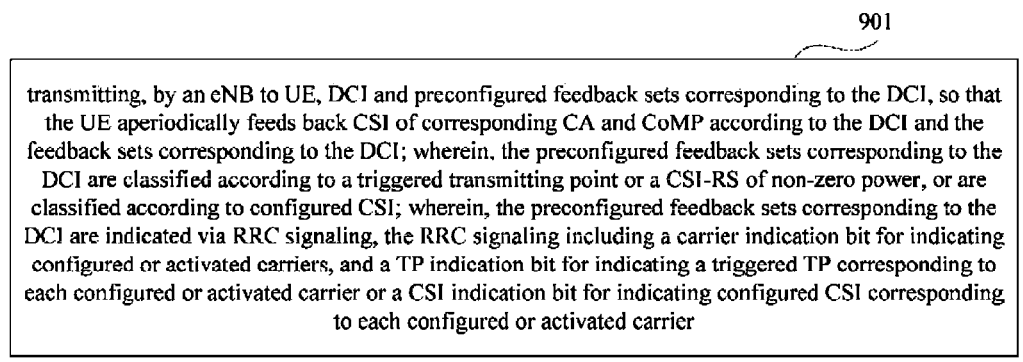
FIG. 9 is a flowchart of a method for triggering aperiodic feedback in coordinated multipoint transmission in triggering aperiodic feedback in a user search space in a joint transmission scenario of CoMP and CA of Embodiment 7 of the present invention.

An embodiment of the present invention further provides a method for triggering aperiodic feedback in coordinated multipoint transmission, in which triggering UE to perform aperiodic report of CSI is achieved by jointly configuring. FIG. 9 is a flowchart of the method. Referring to FIG. 9, the method includes:

step 901: transmitting, by an eNB to UE, DCI and preconfigured feedback sets corresponding to the DCI, so that the UE aperiodically feeds back CSI of corresponding CA and CoMP according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or configured CSI. Wherein, if the carrier indication bit of the configured or activated carriers has already existed, the RRC signaling does not include this part of contents.

In this embodiment, the multiple feedback sets configured via the RRC signaling are also triggered via 2-bit DCI, and are determined by CSI joining carriers and CoMP. However, different from Embodiment 5, the UE is configured with used carriers in the CA transmission, or some carriers are activated. In this embodiment, the RRC signaling used to indicate the aperiodic feedback sets includes not only this part of carrier indication bits, but also the transmitting point indication bits of the triggered transmitting points or the CSI indication bits of the configured CSI corresponding to the configured or activated carriers. That is, the carrier indication bits and the CoMP CSI feedback information corresponding to the configured or activated carriers (TP indication bits of the triggered TPs or the CSI indication bits of the configured CSI) are concatenated into a piece of signaling.

In an embodiment, when the feedback sets are classified according to the triggered transmitting points or the CSI-RS of non-zero power, that is, transmitting points are taken as contents of the aperiodic feedback, the RRC signaling used to indicate the feedback sets is achieved by the carrier indication bits and the TP indication bits of the triggered TPs corresponding to each activated or configured carrier. As shown in FIG. 10a, the RRC signaling includes carrier indication bits (the left of the plus sign in FIG. 10a), in which three carriers are activated or configured for use, and corresponding to each of the three carriers, a TP indication bit of a triggered TP is configured. Referring to the right of the plus sign, assuming that the number of the triggered transmitting points is 3, each carrier needs information of 3 bits.

In another embodiment, when the feedback sets are classified according to the configured CSI, that is, CSI is taken as a content of the aperiodic feedback, the RRC signaling used to indicate the feedback sets is achieved by the carrier indication bits and the CSI indication bits of the configured CSI corresponding to each activated or configured carrier. As shown in FIG. 10b, the RRC signaling includes carrier indication bits shown on the left of the plus sign and the CSI indication bits of the configured CSI corresponding to each activated or configured carrier shown on the right of the plus sign. Wherein, assuming that the number of the configured CSI sets is 5, each carrier needs information of 5 bits.

In the above embodiments, a first concatenate of the RRC signaling being the carrier indication bits and the second concatenate being TP indication bits or CSI indication bits are taken as examples. In particular implementation, a method where a first concatenate is TP indication bits or CSI indication bits and the second concatenate is carrier indication bits may also be employed. That is, the RRC signaling includes carrier indication bits indicating the configured or activated carriers and carrier indication bits indicating a carrier corresponding to each triggered TP or configured CSI, and this embodiment is not limited thereto.

By using the method of this embodiment to trigger the UE to perform the aperiodic feedback, the problem of large feedback overhead due to that multiple pieces of CSI corresponding to different transmitting points and interference assumptions need to be reported in joint transmission of CA and CoMP is solved, and a relatively good tradeoff between system flexibility and signaling overhead is achieved.

Embodiment 8

An embodiment of the present invention further provides a method for triggering aperiodic feedback in coordinated multipoint transmission, which is processing at a UE side corresponding to the method of Embodiment 7. FIG. 11 is a flowchart of the method. Referring to FIG. 11, the method includes:

step 1101: receiving, by UE, DCI and preconfigured feedback sets corresponding to the DCI transmitted by an eNB; and step 1102: feeding back aperiodically CSI of corresponding CA and CoMP by the UE according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a bit for indicating configured or activated carriers, and a bit for indicating carriers corresponding to each triggered TP or configured CSI.

In this embodiment, after receiving the DCI transmitted by the eNB, the UE determines corresponding feedback sets according to the DCI, and performs aperiodic feedback of corresponding CSI according to the contents indicated by the feedback sets. Wherein, the feedback sets are indicated by the eNB via RRC signaling, and corresponding to different classification manners, the RRC signaling employs different indication manners. Particular indication manners are described in detail in Embodiment 7, which shall not be described herein any further.

By using the method of this embodiment, the UE performs aperiodic feedback of corresponding CSI according to the DCI transmitted by the eNB and the feedback sets indicated by the high layer (RRC signaling), thereby solving the problem of large feedback overhead due to that multiple pieces of CSI corresponding to different transmitting points and interference assumptions need to be reported in joint transmission of CA and CoMP, and achieving a relatively good tradeoff between feedback flexibility and system signaling overhead.

Embodiment 9

An embodiment of the present invention further provides a method for triggering aperiodic feedback in coordinated multipoint transmission, in which triggering UE to perform aperiodic report of CSI is also achieved by jointly configuring. FIG. 12 is a flowchart of the method. Referring to FIG. 12, the method includes:

step 1201: transmitting, by an eNB to UE, DCI and preconfigured feedback sets corresponding to the DCI, so that the UE aperiodically feeds back CSI of corresponding CA and CoMP according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier, or the RRC signaling including a carrier indication bit for indicating triggered aperiodically fed back carriers, and a carrier indication bit for indicating a carrier corresponding to each triggered TP or configured CSI.

In this embodiment, the multiple feedback sets configured via the RRC signaling are also triggered via 2-bit DCI, and are determined by CSI joining carriers and CoMP. However, different from Embodiment 7, the UE is not configured with used carriers or does not activate the used carriers in the CA transmission, but triggers use of some carriers in operation. In this embodiment, the RRC signaling used to indicate the aperiodic feedback sets includes carrier indication bits of this part of triggered carriers and the transmitting point indication bits of the triggered transmitting points or the CSI indication bits of the configured CSI corresponding to the triggered carriers. That is, the carrier indication bits of the triggered carriers and the CoMP CSI feedback information corresponding to the triggered carriers (TP indication bits of the triggered TPs or the CSI indication bits of the configured CSI) are concatenated into a piece of signaling.

In an embodiment, when the feedback sets are classified according to the triggered transmitting points or the CSI-RS of non-zero power, that is, transmitting points are taken as contents of the aperiodic feedback, the RRC signaling used to indicate the feedback sets is achieved by the carrier indication bits and the TP indication bits of the triggered TPs corresponding to each triggered carrier. Wherein, as the number of the triggered carriers is variable, the corresponding RRC signaling used to indicate the aperiodic feedback sets is also variable. As shown in FIG. 13a, the RRC signaling includes carrier indication bits (the left of the plus sign in FIG. 13a), in which three carriers (a 0-th, a first and a third carriers) are triggered, and corresponding to each of the three carriers, a TP indication bit of a triggered TP is configured. Referring to the right of the plus sign, assuming that the number of the triggered transmitting points is 3, each carrier needs information of 3 bits.

In another embodiment, when the feedback sets are classified according to the configured CSI, that is, CSI is taken as a content of the aperiodic feedback, the RRC signaling used to indicate the feedback sets is achieved by the carrier indication bits and the CSI indication bits of the configured CSI corresponding to each triggered carrier. As shown in FIG. 13b, the RRC signaling includes carrier indication bits shown on the left of the plus sign and the CSI indication bits of the configured CSI corresponding to each triggered carrier shown on the right of the plus sign. Wherein, assuming that the number of the configured CSI sets is 5, each carrier needs information of 5 bits.

In the above embodiments, a first concatenate of the RRC signaling being the carrier indication bits and the second concatenate being TP indication bits or CSI indication bits are taken as examples. In particular implementation, a method where a first concatenate is TP indication bits or CSI indication bits and the second concatenate is carrier indication bits may also be employed. That is, the RRC signaling includes carrier indication bits indicating the triggered carriers and carrier indication bits indicating a carrier corresponding to each triggered TP or configured CSI, and this embodiment is not limited thereto.

By using the method of this embodiment to trigger the UE to perform the aperiodic feedback, the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Embodiment 10

An embodiment of the present invention further provides a method for triggering aperiodic feedback in coordinated multipoint transmission, which is processing at a UE side corresponding to the method of Embodiment 9. FIG. 14 is a flowchart of the method. Referring to FIG. 14, the method includes:

step 1401: receiving, by UE, DCI and preconfigured feedback sets corresponding to the DCI transmitted by an eNB; and step 1402: feeding back aperiodically CSI of corresponding CA and CoMP by the UE according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier, or the RRC signaling including a carrier indication bit for indicating triggered aperiodically fed back carriers, and a carrier indication bit for indicating a carrier corresponding to each triggered TP or configured CSI.

In this embodiment, after receiving the DCI transmitted by the eNB, the UE determines corresponding feedback sets according to the DCI, and performs aperiodic feedback of corresponding CSI according to the contents indicated by the feedback sets. Wherein, the feedback sets are indicated by the eNB via RRC signaling, and corresponding to different classification manners, the RRC signaling employs different indication manners. Particular indication manners are described in detail in Embodiment 9, which shall not be described herein any further.

By using the method of this embodiment, the UE performs aperiodic feedback of corresponding CSI according to the DCI transmitted by the eNB and the feedback sets indicated by the high layer (RRC signaling), thereby solving the problem of large feedback overhead due to that multiple pieces of CSI corresponding to different transmitting points and interference assumptions need to be reported in joint transmission of CA and CoMP, and achieving a relatively good tradeoff between feedback flexibility and system signaling overhead.

Embodiment 11

An embodiment of the present invention further provides a method for triggering aperiodic feedback in coordinated multipoint transmission, in which triggering UE to perform aperiodic report of CSI is also achieved by jointly configuring. FIG. 15 is a flowchart of the method. Referring to FIG. 15, the method includes:

step 1501: transmitting, by an eNB to UE, DCI and preconfigured feedback sets corresponding to the DCI, so that the UE aperiodically feeds back CSI of corresponding CA and CoMP according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to each triggered carrier.

In this embodiment, in order to lower signaling overhead, it is assumed that all the triggered aperiodically fed back contents in all the triggered carriers are identical, then the RRC signaling used for indicating the aperiodically fed back feedback sets includes only the carrier indication bits of the triggered carriers and the feedback contents fed back in the triggered carriers (TP indication bits or CSI indication bits).

In an embodiment, as shown in FIG. 16a, in a classification manner taking a TP as an aperiodically fed back content, assuming that a carrier 0 and a carrier 1 are triggered and the triggered aperiodically fed back contents in the carriers are identical, the RRC signaling includes only a carrier indication bit and a corresponding TP indication bit.

In another embodiment, as shown in FIG. 16b, in a classification manner taking CSI as an aperiodically fed back content, assuming that the carrier 0 and the carrier 1 are triggered and the triggered aperiodically fed back contents in the carriers are identical, the RRC signaling includes only a carrier indication bit and a corresponding CSI indication bit.

By using the method of this embodiment to trigger the UE to perform the aperiodic feedback, the signaling overhead is low, and the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Embodiment 12

An embodiment of the present invention further provides a method for triggering aperiodic feedback in coordinated multipoint transmission, which is processing at a UE side corresponding to the method of Embodiment 11. FIG. 17 is a flowchart of the method. Referring to FIG. 17, the method includes:

step 1701: receiving, by UE, DCI and preconfigured feedback sets corresponding to the DCI transmitted by an eNB; and step 1702: feeding back aperiodically CSI of corresponding CA and CoMP by the UE according to the DCI and the feedback sets corresponding to the DCI.

In this embodiment, a manner of indicating the DCI is identical to that of Embodiment 1, the contents of which being incorporated herein, which shall not be described herein any further.

In this embodiment, the preconfigured feedback sets corresponding to the DCI may be classified according to a triggered transmitting point or a CSI-RS of non-zero power, or may be classified according to configured CSI, and a particular method of classification is identical to that of Embodiment 1, the contents of which being incorporated herein, which shall not be described herein any further. Furthermore, in this embodiment, the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to each triggered carrier.

In this embodiment, after receiving the DCI transmitted by the eNB, the UE determines corresponding feedback sets according to the DCI, and performs aperiodic feedback of corresponding CSI according to the contents indicated by the feedback sets. Wherein, the feedback sets are indicated by the eNB via RRC signaling, and corresponding to different classification manners, the RRC signaling employs different indication manners. Particular indication manners are described in detail in Embodiment 11, which shall not be described herein any further.

By using the method of this embodiment, the UE performs aperiodic feedback of corresponding CSI according to the DCI transmitted by the eNB and the feedback sets indicated by the high layer (RRC signaling), the signaling is low, the problem of large feedback overhead due to that multiple pieces of CSI corresponding to different transmitting points and interference assumptions need to be reported in joint transmission of CA and CoMP is solved, and a relatively good tradeoff between feedback flexibility and system signaling overhead is achieved.

Scenario where Aperiodic Feedback is Triggered in a Common Search Space

Embodiment 13

An embodiment of the present invention further provides a method for triggering aperiodic feedback in coordinated multipoint transmission, in which aperiodic feedback of CSI is triggered in a common search space. FIG. 18 is a flowchart of the method. Referring to FIG. 18, the method includes:

step 1801: transmitting dynamic control information (DCI) by an eNB to UE, so that the UE aperiodically feeds back corresponding channel state information according to the DCI and preconfigured feedback committed information corresponding to the DCI.

In this embodiment, the preconfigured feedback committed information corresponding to the DCI is, for example, feeding back all the CSI of a first CSI-RS resource of non-zero power, or feeding back first CSI in an aperiodic feedback CSI set, or feeding back first CSI in a triggered aperiodic feedback CSI set.

In this embodiment, when the aperiodic feedback is triggered via the common search space, in order to meet a limit of the number of bits of signaling, only DCI of 1 bit is used for triggering the aperiodic feedback. Wherein, 0 denotes that aperiodic report is not triggered, and 1 denotes that aperiodic report is triggered. And wherein, "1" may have multiple indication manners, such as a feedback set 1 configured by a high layer. The feedback set 1 may also be classified by using the classification method of Embodiment 1, and its particular high-layer indication method may also use the method of Embodiment 1; for example, corresponding to different classification methods, different RRC signaling designs are employed. That is, the method of Embodiment 1 may also be applicable to a scenario where aperiodic feedback is triggered in a common search space. Different from Embodiment 1 in which the aperiodic feedback is indicated via 2-bit information of DCI, in such a scenario in this embodiment, the aperiodic feedback is indicated via 1-bit information of DCI. However, corresponding to the aperiodically fed back feedback sets, the method in Embodiment 1 may be followed in this embodiment. As the methods of classification of feedback sets and high-layer indication of feedback sets are described in Embodiment 1, which shall not be described herein any further.

In this embodiment, in consideration that the UE uses the common search space to trigger the aperiodic report, and a channel state of the UE may be relatively poor, such as being in a state of high speed, a robust transmission mode needs to be employed in actual transmission by the UE, such as turning back to a transmission mode in a single cell; or the UE is in a state of RRC reconfiguration, and in the RRC reconfiguration process, a CSI-RS resource of a measurement set changes, hence, CSI in some states is not accurate; furthermore, when an uplink channel state is not ideal, feedback overhead that can be supported should not be too high.

Taking the above cases into account, in the embodiment of the present invention, aperiodically reported contents are agreed by preconfiguring feedback committed information corresponding to the DCI by the eNB and the UE. And when the eNB triggers the UE via the 1-bit DCI information "1" to perform aperiodic feedback of CSI in the common search space, the UE fixedly feeds back CSI of a certain cell according to the preconfigured feedback committed information. In an embodiment, the feedback committed information indicates to feed back all the CSI of a first CSI-RS resource of non-zero power, the CSI corresponding to CSI of a single cell. In another embodiment, the feedback committed information indicates to feed back first CSI in all CSI, the first CSI corresponding to interference-enabled CSI of a single cell. Hence, the above problem may be solved, and the aperiodic report may be triggered efficiently.

In this embodiment, if it is a scenario of jointing CoMP and CA, indication in a downlink carrier corresponding to triggering an uplink carrier may be RRC configuration, or may be a predetermined fixed CSI or TP resource, or an anchor CSI or TP resource configured by the eNB for the user.

By using the method of this embodiment to trigger the UE to perform the aperiodic feedback, several problems occurred in triggering aperiodic report by the UE in a common search space may be solved, the signaling overhead is low, and a relatively good tradeoff between feedback flexibility and system signaling overhead is achieved.

Embodiment 14

Figure 19:
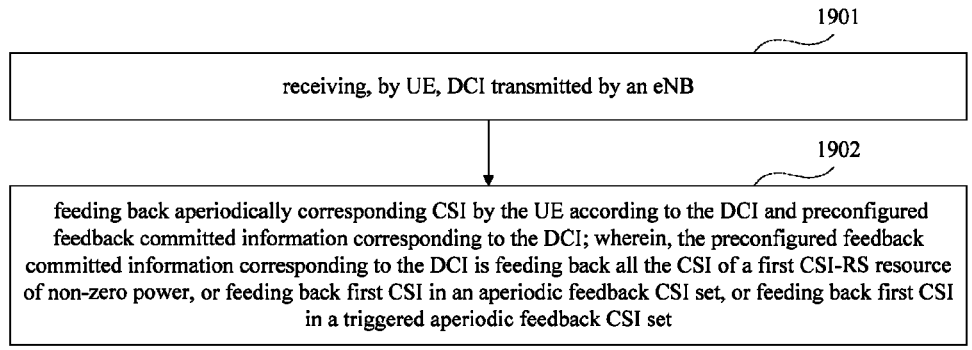
FIG. 19 is a flowchart of processing at a UE side of Embodiment 14 of the present invention corresponding to method of Embodiment 13.

An embodiment of the present invention further provides a method for triggering aperiodic feedback in coordinated multipoint transmission, which is processing at a UE side corresponding to the method of Embodiment 13. FIG. 19 is a flowchart of the method. Referring to FIG. 19, the method includes:

step 1901: receiving, by UE, DCI transmitted by an eNB; and step 1902: feeding back aperiodically corresponding CSI by the UE according to the DCI and preconfigured feedback committed information corresponding to the DCI;

In this embodiment, the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

With the method of this embodiment, as whether the aperiodic feedback is performed is indicated via only 1-bit information of DCI, the UE performs corresponding aperiodic feedback according to an agreement made between it and the eNB in determining to perform aperiodic feedback according to the DCI. Therefore, several problems occurred in triggering aperiodic report by the UE in a common search space may be solved, the signaling overhead is low, and a relatively good tradeoff between feedback flexibility and system signaling overhead is achieved.

Similar to Embodiment 13, as the eNB may also indicate fed back contents in a manner of preconfiguring feedback sets corresponding to the 1-bit DCI in such a scenario, at the UE side, the method of Embodiment 2 may be employed to achieve aperiodic feedback.

Embodiment 15

Figure 20:
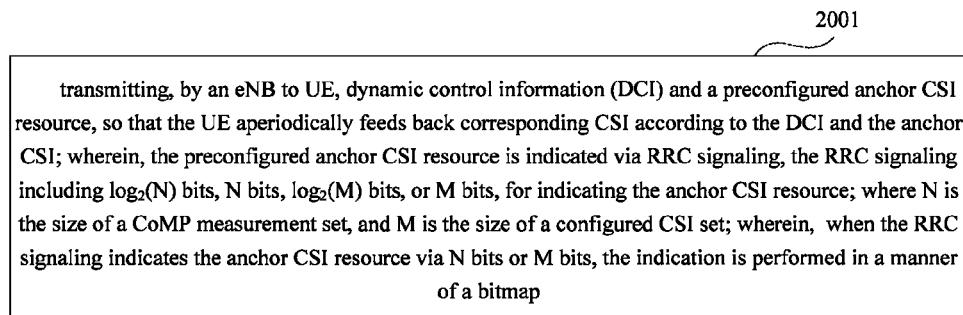
FIG. 20 is a flowchart of a method for triggering aperiodic feedback in coordinated multipoint transmission in triggering aperiodic feedback in a common search space of Embodiment 15 of the present invention.

An embodiment of the present invention further provides a method for triggering aperiodic feedback in coordinated multipoint transmission, in which aperiodic feedback is also triggered in a common search space. FIG. 20 is a flowchart of the method. Referring to FIG. 20, the method includes:

step 2001: transmitting, by an eNB to UE, dynamic control information (DCI) and a preconfigured anchor CSI resource, so that the UE aperiodically feeds back corresponding CSI according to the DCI and the anchor CSI resource.

In this embodiment, the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a CoMP measurement set, and M is the size of a configured CSI set.

In this embodiment, the eNB preconfigures an anchor CSI resource, the anchor CSI resource being specifically used to triggering aperiodic feedback, especially for use in triggering aperiodic feedback in a common search space. Wherein, the anchor CSI resource may be selected by the eNB according to RSRP (reference signal receiving power) and/or RSRQ (reference signal receiving quality), and this embodiment is not limited thereto. The anchor CSI resource may be at least one CSI resource to which a CSI-RS of non-zero power corresponds, and may also be at least one CSI resource in an aperiodically fed back CSI set.

In this embodiment, the anchor CSI resource may be indicated via RRC signaling. In an embodiment, the CSI resource is differentiated according to a triggered TP (a CSI-RS of non-zero power), and the RRC signaling indicates the triggered TP (CSI-RS of non-zero power) via $\log_2(N)$ bits, so that the UE determines the anchor CSI resource from CSI resources to which N TPs (CSI-RSs of non-zero power) correspond, where, N is the size of a CoMP measurement set; or the RRC signaling indicates the anchor CSI resource via N bits, and at this moment, a bitmap manner may be used. In another embodiment, the CSI resource is differentiated according to configured CSI, and the RRC signaling indicates a position of the anchor CSI resource in a CSI set configured by the eNB for aperiodically fed back via $\log_2(M)$ bits, or indicates the position via a bitmap of M bits, M being the size of a CSI set configured by the eNB for aperiodic feedback.

By using the method of this embodiment to trigger the UE to perform the aperiodic feedback, several problems occurred in triggering aperiodic report by the UE in a common search space may be solved, and the signaling overhead is low.

Embodiment 16

Figure 21:
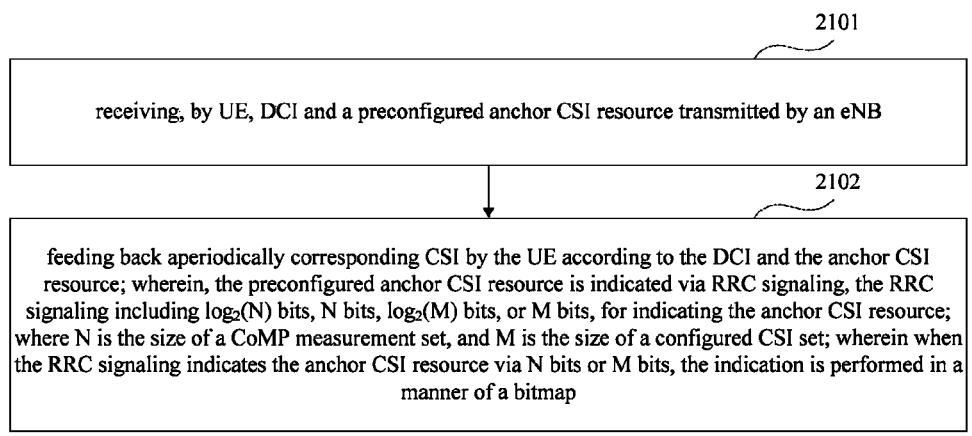
FIG. 21 is a flowchart of processing at a UE side of Embodiment 16 of the present invention corresponding to method of Embodiment 15.

An embodiment of the present invention further provides a method for triggering aperiodic feedback in coordinated multipoint transmission, which is processing at a UE side corresponding to the method of Embodiment 15. FIG. 21 is a flowchart of the method. Referring to FIG. 21, the method includes:

step 2101: receiving, by UE, DCI and a preconfigured anchor CSI resource transmitted by an eNB; and step 2102: feeding back aperiodically corresponding CSI by the UE according to the DCI and the anchor CSI resource.

In this embodiment, the anchor CSI resource is at least one CSI resource to which a CSI-RS of non-zero power corresponds, or at least one CSI resource in an aperiodic feedback CSI set.

In this embodiment, the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a CoMP measurement set, and M is the size of a configured CSI set; wherein when the RRC signaling indicates the anchor CSI resource via N bits or M bits, the indication is performed in a manner of a bitmap.

With the method of this embodiment, as whether the aperiodic feedback is performed is indicated via only 1-bit information of DCI, the UE performs corresponding aperiodic feedback according to the anchor CSI resource preconfigured by the eNB in determining to perform aperiodic feedback according to the DCI. Therefore, several problems occurred in triggering aperiodic report by the UE in a common search space may be solved, and the signaling overhead is low.

Figure 22:
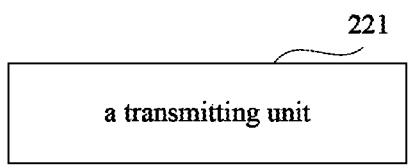
FIG. 22 is a schematic diagram of the structure of an eNB an embodiment of the present invention corresponding to Embodiment 1.

Corresponding to the method of Embodiment 1, an embodiment of the present invention further provides an eNB. As the principle of the eNB for solving problems is similar to that of the method in Embodiment 1, the implementation of the method in Embodiment 1 is referred to for the implementation of the eNB, and the repeated parts shall not be described any further. FIG. 22 is a schematic diagram of the structure of the eNB. Referring to FIG. 22, the eNB includes:

a transmitting unit 221 configured to transmit to UE, 1-bit or 2-bit dynamic control information (DCI) and feedback sets corresponding to the DCI preconfigured via RRC signaling, so that the UE aperiodically feeds back corresponding CSI according to the DCI and the feedback sets corresponding to the DCI.

Wherein, the feedback sets corresponding to the DCI preconfigured via RRC signaling are classified according to a triggered transmitting point or a CSI-RS of non-zero power, or are classified according to configured CSI, or are classified according to an interference type.

Wherein, the number of the feedback sets corresponding to the 1-bit DCI is 1, and the number of the feedback sets corresponding to the 2-bit DCI is 3 or 2.

By using the eNB of this embodiment to trigger the UE to perform the aperiodic feedback of CSI, a relatively good tradeoff between feedback flexibility and system signaling overhead may be achieved.

Figure 23:
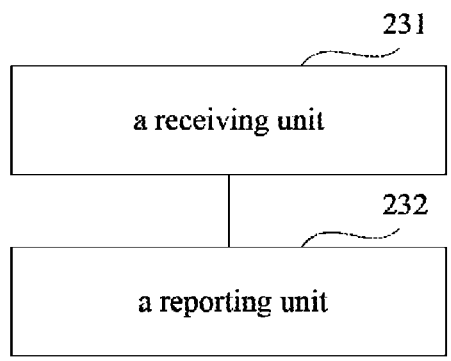
FIG. 23 is a schematic diagram of the structure of UE an embodiment of the present invention corresponding to Embodiment 2.

Corresponding to the method of Embodiment 2, an embodiment of the present invention further provides user equipment (UE). As the principle of the UE for solving problems is similar to that of the method in Embodiment 2, the implementation of the method in Embodiment 2 is referred to for the implementation of the UE, and the repeated parts shall not be described any further. FIG. 23 is a schematic diagram of the structure of the UE. Referring to FIG. 23, the UE includes:

a receiving unit 231 configured to receive 1-bit or 2-bit DCI and feedback sets corresponding to the DCI preconfigured via RRC signaling transmitted by an eNB; and a reporting unit 232 configured to feed back aperiodically corresponding CSI according to the DCI and the feedback sets corresponding to the DCI.

Wherein the feedback sets corresponding to the DCI preconfigured via RRC signaling are classified according to a triggered transmitting point or a CSI-RS of non-zero power, or are classified according to configured CSI, or are classified according to an interference type.

Wherein, the number of the feedback sets corresponding to the 1-bit DCI is 1, and the number of the feedback sets corresponding to the 2-bit DCI is 3 or 2.

By using the UE of this embodiment to perform the aperiodic feedback of CSI according to the triggering by the eNB, a relatively good tradeoff between feedback flexibility and system signaling overhead may be achieved.

Figure 24:
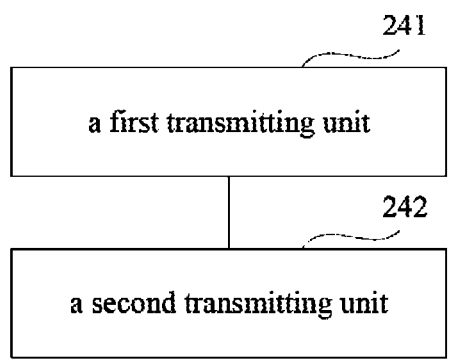
FIG. 24 is a schematic diagram of the structure of an eNB an embodiment of the present invention corresponding to Embodiment 3.

Corresponding to the method of Embodiment 3, an embodiment of the present invention further provides an eNB. As the principle of the eNB for solving problems is similar to that of the method in Embodiment 3, the implementation of the method in Embodiment 3 is referred to for the implementation of the eNB, and the repeated parts shall not be described any further. FIG. 24 is a schematic diagram of the structure of the eNB. Referring to FIG. 24, the eNB includes:

a first transmitting unit 241 configured to transmit to the UE, 1-bit or 2-bit first DCI and feedback sets corresponding to the first DCI preconfigured via RRC signaling, so that the UE aperiodically feeds back CSI of corresponding CA according to the first DCI and the feedback sets corresponding to the first DCI; and a second transmitting unit 242 configured to transmit to the UE, 1-bit or 2-bit second DCI and feedback sets corresponding to the second DCI preconfigured via RRC signaling, so that the UE aperiodically feeds back CSI of corresponding CoMP according to the second DCI and the feedback sets corresponding to the second DCI.

Wherein, the feedback sets corresponding to the second DCI preconfigured via RRC signaling are classified according to a triggered transmitting point or a CSI-RS of non-zero power, or are classified according to configured CSI, or are classified according to an interference type.

Wherein, the number of the feedback sets corresponding to the 1-bit first DCI is 1, the number of the feedback sets corresponding to the 1-bit second DCI is 1, the number of the feedback sets corresponding to the 2-bit first DCI is 3 or 2, and the number of the feedback sets corresponding to the 2-bit second DCI is 3 or 2.

By using the eNB of this embodiment to trigger the UE to perform the aperiodic feedback of CSI, a relatively good tradeoff between feedback flexibility and system signaling overhead may be achieved.

Figure 25:
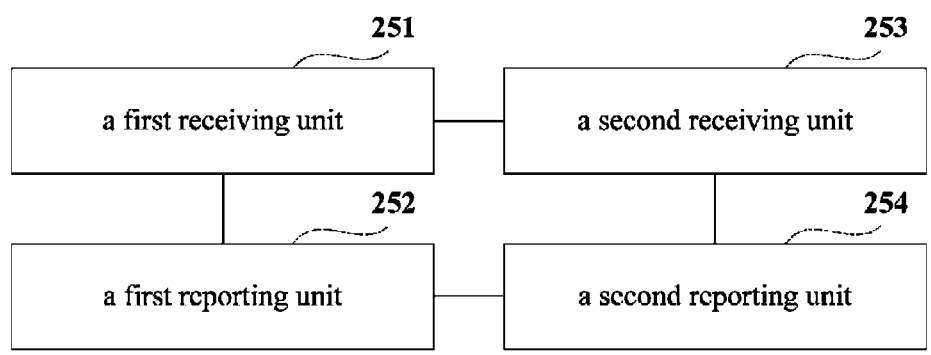
FIG. 25 is a schematic diagram of the structure of UE an embodiment of the present invention corresponding to Embodiment 4.

Corresponding to the method of Embodiment 4, an embodiment of the present invention further provides user equipment (UE). As the principle of the UE for solving problems is similar to that of the method in Embodiment 4, the implementation of the method in Embodiment 4 is referred to for the implementation of the UE, and the repeated parts shall not be described any further. FIG. 25 is a schematic diagram of the structure of the UE. Referring to FIG. 25, the UE includes:

a first receiving unit 251 configured to receive 1-bit or 2-bit first DCI and feedback sets corresponding to the first DCI preconfigured via RRC signaling transmitted by an eNB;

a first reporting unit 252 configured to feed back aperiodically CSI of corresponding CA according to the first DCI and the feedback sets corresponding to the first DCI;

a second receiving unit 253 configured to receive 1-bit or 2-bit second DCI and preconfigured feedback sets corresponding to the second DCI transmitted by the eNB; and a second reporting unit 254 configured to feed back aperiodically CSI of corresponding CoMP according to the second DCI and the feedback sets corresponding to the second DCI.

Wherein, the preconfigured feedback sets corresponding to the second DCI are classified according to a triggered transmitting point or a CSI-RS of non-zero power, or are classified according to configured CSI, or are classified according to an interference type.

Wherein, the number of the feedback sets corresponding to the 1-bit first DCI is 1, the number of the feedback sets corresponding to the 1-bit second DCI is 1, the number of the feedback sets corresponding to the 2-bit first DCI is 3 or 2, and the number of the feedback sets corresponding to the 2-bit second DCI is 3 or 2.

By using the UE of this embodiment to perform the aperiodic feedback of CSI according to the triggering by the eNB, a relatively good tradeoff between feedback flexibility and system signaling overhead may be achieved.

Figure 26:
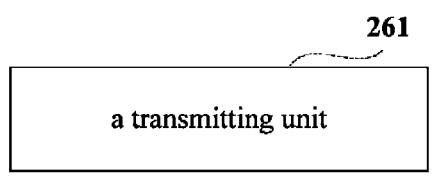
FIG. 26 is a schematic diagram of the structure of an eNB an embodiment of the present invention corresponding to Embodiment 5.

Corresponding to the method of Embodiment 5, an embodiment of the present invention further provides an eNB. As the principle of the eNB for solving problems is similar to that of the method in Embodiment 5, the implementation of the method in Embodiment 5 is referred to for the implementation of the eNB, and the repeated parts shall not be described any further. FIG. 26 is a schematic diagram of the structure of the eNB. Referring to FIG. 26, the eNB includes:

a transmitting unit 261 configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit corresponding to each triggered transmitting point or each piece of configured CSI.

Wherein, the number of the feedback sets corresponding to the 2-bit DCI is 3 or 2.

By using the eNB of this embodiment to trigger the UE to perform the aperiodic feedback of CSI, a relatively good tradeoff between feedback flexibility and system signaling overhead may be achieved.

Figure 27:
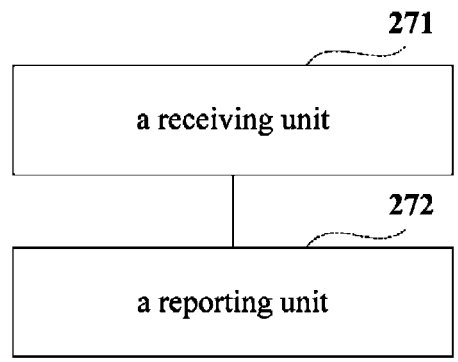
FIG. 27 is a schematic diagram of the structure of UE an embodiment of the present invention corresponding to Embodiment 6.

Corresponding to the method of Embodiment 6, an embodiment of the present invention further provides user equipment (UE). As the principle of the UE for solving problems is similar to that of the method in Embodiment 6, the implementation of the method in Embodiment 6 is referred to for the implementation of the UE, and the repeated parts shall not be described any further. FIG. 27 is a schematic diagram of the structure of the UE. Referring to FIG. 27, the UE includes:

a receiving unit 271 configured to receive 2-bit DCI and feedback sets corresponding to the DCI preconfigured via RRC signaling transmitted by an eNB; and a reporting unit 272 configured to feed back aperiodically CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit corresponding to each triggered transmitting point or each piece of configured CSI.

Wherein, the number of the feedback sets corresponding to the 2-bit DCI is 3 or 2.

By using the UE of this embodiment to perform the aperiodic feedback of CSI according to the triggering by the eNB, a relatively good tradeoff between feedback flexibility and system signaling overhead may be achieved.

Figure 28:
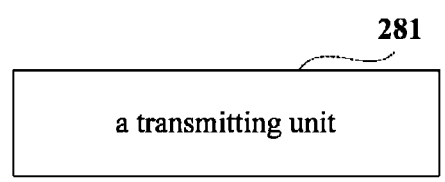
FIG. 28 is a schematic diagram of the structure of an eNB an embodiment of the present invention corresponding to Embodiment 7.

Corresponding to the method of Embodiment 7, an embodiment of the present invention further provides an eNB. As the principle of the eNB for solving problems is similar to that of the method in Embodiment 7, the implementation of the method in Embodiment 7 is referred to for the implementation of the eNB, and the repeated parts shall not be described any further. FIG. 28 is a schematic diagram of the structure of the eNB. Referring to FIG. 28, the eNB includes:

a transmitting unit 281 configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or corresponding to each piece of configured CSI.

Wherein, the number of the feedback sets corresponding to the 2-bit DCI is 3 or 2.

By using the eNB of this embodiment to trigger the UE to perform the aperiodic feedback of CSI, a relatively good tradeoff between feedback flexibility and system signaling overhead may be achieved.

Figure 29:
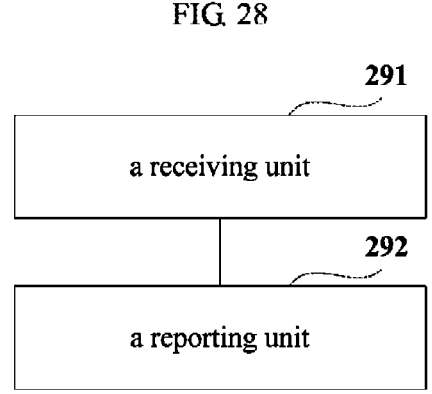
FIG. 29 is a schematic diagram of the structure of UE an embodiment of the present invention corresponding to Embodiment 8.

Corresponding to the method of Embodiment 8, an embodiment of the present invention further provides user equipment (UE). As the principle of the UE for solving problems is similar to that of the method in Embodiment 8, the implementation of the method in Embodiment 8 is referred to for the implementation of the UE, and the repeated parts shall not be described any further. FIG. 29 is a schematic diagram of the structure of the UE. Referring to FIG. 29, the UE includes:

a receiving unit 291 configured to receive 2-bit DCI and feedback sets corresponding to the DCI preconfigured via RRC signaling transmitted by an eNB; and a reporting unit 292 configured to feed back aperiodically CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating configured or activated carriers, and a TP indication bit for indicating a triggered TP corresponding to each configured or activated carrier or a CSI indication bit for indicating configured CSI corresponding to each configured or activated carrier, or the RRC signaling including a carrier indication bit for indicating configured or activated carriers, and a carrier indication bit for indicating a carrier corresponding to each triggered TP or configured CSI.

Wherein, the number of the feedback sets corresponding to the 2-bit DCI is 3 or 2.

By using the UE of this embodiment to perform the aperiodic feedback of CSI according to the triggering by the eNB, a relatively good tradeoff between feedback flexibility and system signaling overhead may be achieved.

Figure 30:
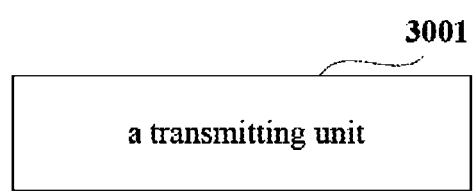
FIG. 30 is a schematic diagram of the structure of an eNB an embodiment of the present invention corresponding to Embodiment 9.

Corresponding to the method of Embodiment 9, an embodiment of the present invention further provides an eNB. As the principle of the eNB for solving problems is similar to that of the method in Embodiment 9, the implementation of the method in Embodiment 9 is referred to for the implementation of the eNB, and the repeated parts shall not be described any further. FIG. 30 is a schematic diagram of the structure of the eNB. Referring to FIG. 30, the eNB includes:

a transmitting unit 3001 configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to each triggered carrier or a CSI indication bit for indicating configured CSI corresponding to each triggered carrier, or the RRC signaling including a carrier indication bit for indicating triggered aperiodically fed back carriers, and a carrier indication bit for indicating a carrier corresponding to each triggered TP or corresponding to each piece of configured CSI.

Wherein, the number of the feedback sets corresponding to the 2-bit DCI is 3 or 2.

By using the eNB of this embodiment to trigger the UE to perform the aperiodic feedback of CSI, a relatively good tradeoff between feedback flexibility and system signaling overhead may be achieved.

Figure 31:
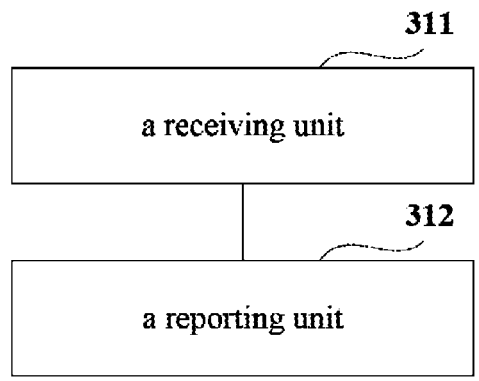
FIG. 31 is a schematic diagram of the structure of UE an embodiment of the present invention corresponding to Embodiment 10.

Corresponding to the method of Embodiment 10, an embodiment of the present invention further provides user equipment (UE). As the principle of the UE for solving problems is similar to that of the method in Embodiment 10, the implementation of the method in Embodiment 10 is referred to for the implementation of the UE, and the repeated parts shall not be described any further. FIG. 31 is a schematic diagram of the structure of the UE. Referring to FIG. 31, the UE includes:

a receiving unit 311 configured to receive 2-bit DCI and feedback sets corresponding to the DCI preconfigured via RRC signaling transmitted by an eNB; and a reporting unit 312 configured to feed back aperiodically CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating triggered aperiodically fed back carriers, and a TP indication bit for indicating a triggered TP corresponding to a triggered carrier or a CSI indication bit for indicating configured CSI corresponding to a triggered carrier, or the RRC signaling including a carrier indication bit for indicating triggered aperiodically fed back carriers, and a carrier indication bit for indicating a carrier corresponding to each triggered TP or configured CSI.

Wherein, the number of the feedback sets corresponding to the 2-bit DCI is 3 or 2.

By using the UE of this embodiment to perform the aperiodic feedback of CSI according to the triggering by the eNB, a relatively good tradeoff between feedback flexibility and system signaling overhead may be achieved.

Figure 32:
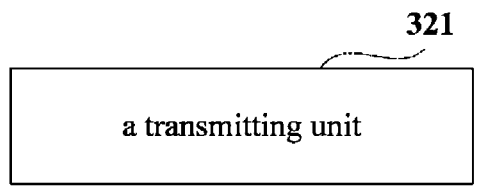
FIG. 32 is a schematic diagram of the structure of an eNB an embodiment of the present invention corresponding to Embodiment 11.

Corresponding to the method of Embodiment 11, an embodiment of the present invention further provides an eNB. As the principle of the eNB for solving problems is similar to that of the method in Embodiment 11, the implementation of the method in Embodiment 11 is referred to for the implementation of the eNB, and the repeated parts shall not be described any further. FIG. 32 is a schematic diagram of the structure of the eNB. Referring to FIG. 32, the eNB includes:

a transmitting unit 321 configured to transmit to the UE, 2-bit DCI and feedback sets corresponding to the DCI preconfigured via RRC signaling, so that the UE aperiodically feeds back CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers.

Wherein, the number of the feedback sets corresponding to the 2-bit DCI is 3 or 2.

By using the eNB of this embodiment to trigger the UE to perform the aperiodic feedback of CSI, a relatively good tradeoff between feedback flexibility and system signaling overhead may be achieved.

Figure 33:
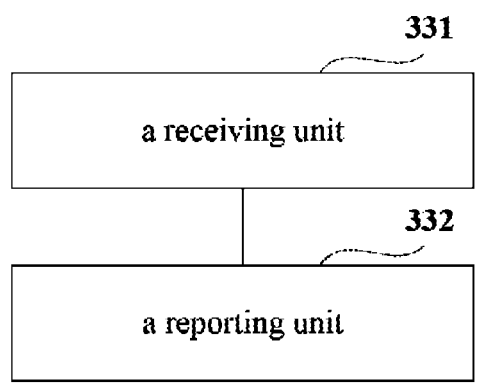
FIG. 33 is a schematic diagram of the structure of UE an embodiment of the present invention corresponding to Embodiment 12.

Corresponding to the method of Embodiment 12, an embodiment of the present invention further provides user equipment (UE). As the principle of the UE for solving problems is similar to that of the method in Embodiment 12, the implementation of the method in Embodiment 12 is referred to for the implementation of the UE, and the repeated parts shall not be described any further. FIG. 33 is a schematic diagram of the structure of the UE. Referring to FIG. 33, the UE includes:

a receiving unit 331 configured to receive 2-bit DCI and feedback sets corresponding to the DCI preconfigured via RRC signaling transmitted by an eNB; and a reporting unit 332 configured to feed back aperiodically CSI of corresponding CA and CoMP according to the DCI and the feedback sets corresponding to the DCI.

Wherein, the preconfigured feedback sets corresponding to the DCI are classified according to a triggered transmitting point or a CSI-RS of non-zero power, or are classified according to configured CSI.

Wherein, the preconfigured feedback sets corresponding to the DCI are indicated via RRC signaling, the RRC signaling including a carrier indication bit for indicating triggered carriers, and a TP indication bit or a CSI indication bit for indicating fed back contents corresponding to all triggered carriers.

Wherein, the number of the feedback sets corresponding to the 2-bit DCI is 3 or 2.

By using the UE of this embodiment to perform the aperiodic feedback of CSI according to the triggering by the eNB, a relatively good tradeoff between feedback flexibility and system signaling overhead may be achieved.

Figure 34:
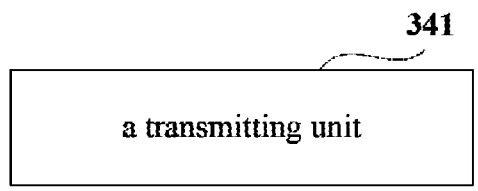
FIG. 34 is a schematic diagram of the structure of an eNB an embodiment of the present invention corresponding to Embodiment 13.

Corresponding to the method of Embodiment 13, an embodiment of the present invention further provides an eNB. As the principle of the eNB for solving problems is similar to that of the method in Embodiment 13, the implementation of the method in Embodiment 13 is referred to for the implementation of the eNB, and the repeated parts shall not be described any further. FIG. 34 is a schematic diagram of the structure of the eNB. Referring to FIG. 34, the eNB includes:

a transmitting unit 341 configured to transmit 1-bit DCI to the UE, so that the UE aperiodically feeds back corresponding CSI according to the DCI and preconfigured feedback committed information corresponding to the DCI.

Wherein, the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

By using the eNB of this embodiment to trigger the UE to perform the aperiodic feedback of CSI, a relatively good tradeoff between feedback flexibility and system signaling overhead may be achieved.

Figure 35:
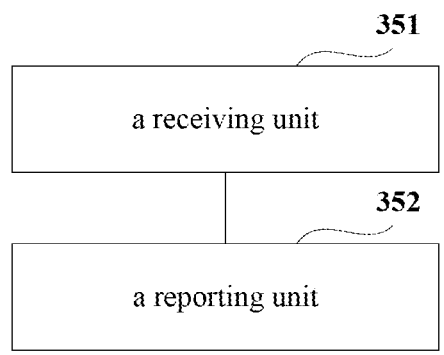
FIG. 35 is a schematic diagram of the structure of UE an embodiment of the present invention corresponding to Embodiment 14.

Corresponding to the method of Embodiment 14, an embodiment of the present invention further provides user equipment (UE). As the principle of the UE for solving problems is similar to that of the method in Embodiment 14, the implementation of the method in Embodiment 14 is referred to for the implementation of the UE, and the repeated parts shall not be described any further. FIG. 35 is a schematic diagram of the structure of the UE. Referring to FIG. 35, the UE includes:

a receiving unit 351 configured to receive 1-bit DCI transmitted by an eNB; and a reporting unit 352 configured to feed back aperiodically corresponding CSI according to the DCI and preconfigured feedback committed information corresponding to the DCI.

Wherein, the preconfigured feedback committed information corresponding to the DCI is feeding back all the CSI of a first CSI-RS resource of non-zero power, or feeding back first CSI in an aperiodic feedback CSI set, or feeding back first CSI in a triggered aperiodic feedback CSI set.

By using the UE of this embodiment to perform the aperiodic feedback of CSI according to the triggering by the eNB, a relatively good tradeoff between feedback flexibility and system signaling overhead may be achieved.

Figure 36:
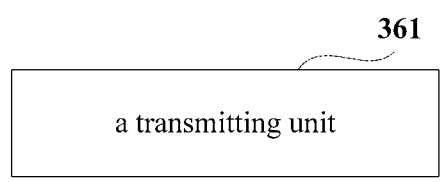
FIG. 36 is a schematic diagram of the structure of an eNB an embodiment of the present invention corresponding to Embodiment 15.

Corresponding to the method of Embodiment 15, an embodiment of the present invention further provides an eNB. As the principle of the eNB for solving problems is similar to that of the method in Embodiment 15, the implementation of the method in Embodiment 15 is referred to for the implementation of the eNB, and the repeated parts shall not be described any further. FIG. 36 is a schematic diagram of the structure of the eNB. Referring to FIG. 36, the eNB includes:

a transmitting unit 361 configured to transmit to the UE, 1-bit DCI and an anchor CSI resource preconfigured via RRC signaling, so that the UE aperiodically feeds back corresponding CSI according to the DCI and the anchor CSI.

Wherein, the preconfigured anchor CSI resource is at least one CSI resource to which a CSI-RS of non-zero power corresponds, or at least one CSI resource in an aperiodic feedback CSI set.

Wherein, the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a CoMP measurement set, and M is the size of a CSI set configured by the eNB for aperiodic feedback; wherein when the RRC signaling indicates the anchor CSI resource via N bits or M bits, the indication is performed in a manner of a bitmap.

By using the eNB of this embodiment to trigger the UE to perform the aperiodic feedback of CSI, a relatively good tradeoff between feedback flexibility and system signaling overhead may be achieved.

Figure 37:
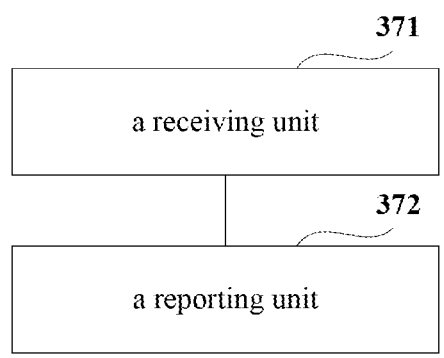
FIG. 37 is a schematic diagram of the structure of UE an embodiment of the present invention corresponding to Embodiment 16.

Corresponding to the method of Embodiment 16, an embodiment of the present invention further provides user equipment (UE). As the principle of the UE for solving problems is similar to that of the method in Embodiment 16, the implementation of the method in Embodiment 16 is referred to for the implementation of the UE, and the repeated parts shall not be described any further. FIG. 37 is a schematic diagram of the structure of the UE. Referring to FIG. 37, the UE includes:

a receiving unit 371 configured to receive 1-bit DCI and an anchor CSI resource preconfigured via high-layer signaling transmitted by an eNB; and a reporting unit 372 configured to feed back aperiodically corresponding CSI according to the DCI and the anchor CSI resource.

Wherein, the preconfigured anchor CSI resource is at least one CSI resource to which a CSI-RS of non-zero power corresponds, or at least one CSI resource in an aperiodic feedback CSI set.

Wherein, the preconfigured anchor CSI resource is indicated via RRC signaling, the RRC signaling including $\log_2(N)$ bits, N bits, $\log_2(M)$ bits, or M bits, for indicating the anchor CSI resource; where N is the size of a CoMP measurement set, and M is the size of a CSI set configured by the eNB for aperiodic feedback; wherein when the RRC signaling indicates the anchor CSI resource via N bits or M bits, the indication is performed in a manner of a bitmap.

By using the UE of this embodiment to perform the aperiodic feedback of CSI according to the triggering by the eNB, a relatively good tradeoff between feedback flexibility and system signaling overhead may be achieved.

An embodiment of the present invention further provides a computer-readable program, wherein when the program is executed in an eNB, the program enables a computer to carry out the method for triggering aperiodic feedback in coordinated multipoint transmission as described in embodiments 1, 3, 5, 7, 9, 11, 13 and 15, in the eNB.

An embodiment of the present invention further provides a storage medium in which a computer-readable program is stored, wherein the computer-readable program enables a computer to carry out the method for triggering aperiodic feedback in coordinated multipoint transmission as described in embodiments 1, 3, 5, 7, 9, 11, 13 and 15, in an eNB.

An embodiment of the present invention further provides a computer-readable program, wherein when the program is executed in terminal equipment, the program enables a computer to carry out the method for triggering aperiodic feedback in coordinated multipoint transmission as described in embodiments 2, 4, 6, 8, 10, 12, 14 and 16, in the terminal equipment.

An embodiment of the present invention further provides a storage medium in which a computer-readable program is stored, wherein the computer-readable program enables a computer to carry out the method for triggering aperiodic feedback in coordinated multipoint transmission as described in embodiments 2, 4, 6, 8, 10, 12, 14 and 16, in terminal equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. An eNB, configured to trigger a User Equipment (UE) to aperiodically feed back channel state information, the eNB comprising:
a transmitter configured to transmit to the UE, downlink control information and configured feedback sets corresponding to the downlink control information configured via Radio Resource Control (RRC) signaling, so that the UE aperiodically feeds back channel state information of corresponding Carrier Aggregation (CA) and Coordinated Multipoint Transmission (CoMP) according to the downlink control information and the feedback sets corresponding to the downlink control information;
wherein the feedback sets corresponding to the downlink control information configured via RRC signaling are classified according to channel state information configuration,
wherein the configured feedback sets corresponding to the downlink control information are indicated via RRC signaling, the RRC signaling comprises, a carrier indication bit corresponding to each channel state information configuration,
wherein 1 bit information or 2 bit information is used in a channel state information request field in the downlink control information for uplink transmission;
when the channel state information request field is the 1 bit information, the feedback sets is one feedback set corresponding to a value of the channel state information request field 1 in the downlink control information; and
when the channel state information request field is the 2 bit information, the feedback sets are three feedback sets corresponding respectively to values of the channel state information request field 01, 10 and 11 in the downlink control information, or the feedback sets are two feedback sets corresponding respectively to the values of the channel state information request field 10 and 11 in the downlink control information.

2. The eNB according to claim 1, wherein each of the feedback sets is configured to indicate a channel state information set needing to be triggered, wherein the feedback sets are indicated via a bitmap of M bits of RRC signaling, where, M is a size of a channel state information set configured by the eNB for aperiodic feedback.

3. The eNB according to claim 1, wherein the configured feedback sets corresponding to the downlink control information are indicated via RRC signaling, the RRC signaling comprising a carrier indication bit for indicating configured carriers, and a channel state indication bit for indicating the channel state information configuration corresponding to each configured carrier.

4. The eNB according to claim 1, wherein, when the UE performs CA, the UE aperiodically feeds back channel state information according to the downlink control information and the feedback sets corresponding to the downlink control information, the RRC signaling comprises a carrier indication bit corresponding to each channel state information configuration.

5. The eNB according to claim 1, wherein, when the UE performs CoMP, the UE aperiodically feeds back channel state information according to the downlink control information and the feedback sets corresponding to the downlink control information, the RRC signaling comprises a carrier indication bit corresponding to each channel state information configuration.

6. A User Equipment (UE), comprising:
a receiver configured to receive downlink control information and configured feedback sets corresponding to the downlink control information configured via Radio Resource Control (RRC) signaling transmitted by an eNB; and
a transmitter configured to feed back aperiodically channel state information of corresponding Carrier Aggregation (CA) and Coordinated Multipoint Transmission (CoMP) according to the downlink control information and the feedback sets corresponding to the downlink control information;
wherein the configured feedback sets corresponding to the downlink control information are classified according to a configured channel state information request,
wherein the configured feedback sets corresponding to the downlink control information are indicated via the RRC signaling, the RRC signaling comprising a carrier indication bit corresponding to each channel state information,
wherein 1 bit information or 2 bit information is used in a channel state information request field in the downlink control information for uplink transmission;
when the channel state information request field is 1 bit information, the feedback sets is one feedback set corresponding to a value of channel state information request field 1 in the downlink control information; and
when the channel state information request field is 2 bit information, the feedback sets are three feedback sets corresponding respectively to values of channel state information request field 01, 10 and 11 in the downlink control information, or the feedback sets are two feedback sets corresponding respectively to the values of channel state information request field 10 and 11 in the downlink control information.

7. The UE according to claim 6, wherein the receiver is configured to receive 2-bit downlink control information;
wherein the RRC signaling comprising a carrier indication bit corresponding to each channel state information configuration; and
wherein the number of the feedback sets corresponding to the 2-bit channel state information request field is 3 or 2.

8. The UE according to claim 6, wherein the receiver is configured to receive 2-bit channel state information request field; and
wherein the configured feedback sets corresponding to the downlink control information are indicated via RRC signaling, the RRC signaling comprising a carrier indication bit for indicating configured carriers, and a channel state information indication bit for indicating a channel state information configuration corresponding to each configured carrier; and
wherein the number of the feedback sets corresponding to the 2-bit channel state information request field is 3 or 2.

9. The UE according to claim 6, wherein each of the feedback sets is configured to indicate a channel state information set needing to be triggered, wherein the feedback sets are indicated via a bitmap of M bits of RRC signaling, where, M is a size of a channel state information set configured by the eNB for aperiodic feedback.

10. The UE according to claim 6, wherein, when the transmitter performs CA, the transmitter aperiodically feeds back channel state information according to the downlink control information and the feedback sets corresponding to the downlink control information, the RRC signaling comprises a carrier indication bit corresponding to each channel state information configuration.

11. The UE according to claim 6, wherein, when the transmitter performs CoMP, the transmitter aperiodically feeds back channel state information according to the downlink control information and the feedback sets corresponding to the downlink control information, the RRC signaling comprises a carrier indication bit corresponding to each channel state information configuration.

* * * * *